(12) United States Patent
Nakamura

(10) Patent No.: US 9,880,027 B2
(45) Date of Patent: Jan. 30, 2018

(54) RESOLVER EXCITATION APPARATUS

(71) Applicant: AISIN AW CO., LTD., Anjo-shi, Aichi-ken (JP)

(72) Inventor: Yasushi Nakamura, Nishio (JP)

(73) Assignees: AISIN AW CO., LTD., Anjo (JP); AISIN AW INDUSTRIES CO., LTD, Echizen-shi, Fukui (JP)

( * ) Notice: Subject to any disclaimer, the term of this patent is extended or adjusted under 35 U.S.C. 154(b) by 741 days.

(21) Appl. No.: 14/366,561

(22) PCT Filed: Sep. 28, 2012

(86) PCT No.: PCT/JP2012/075035
§ 371 (c)(1),
(2) Date: Jun. 18, 2014

(87) PCT Pub. No.: WO2013/125083
PCT Pub. Date: Aug. 29, 2013

(65) Prior Publication Data
US 2014/0361792 A1 Dec. 11, 2014

(30) Foreign Application Priority Data
Feb. 24, 2012 (JP) .................. 2012-039081

(51) Int. Cl.
*G01D 5/20* (2006.01)

(52) U.S. Cl.
CPC ........... *G01D 5/20* (2013.01); *G01D 5/2073* (2013.01)

(58) Field of Classification Search
CPC ................ G01D 5/20; G01D 5/2073

USPC .......................................... 324/655
See application file for complete search history.

(56) References Cited

U.S. PATENT DOCUMENTS

| 2,582,208 A | 1/1952 | Sherwin |
| 3,350,550 A * | 10/1967 | Christiansen .......... G08C 19/46 323/216 |
| 3,649,735 A * | 3/1972 | Coburn .................... G09B 9/56 434/9 |
| 3,680,118 A * | 7/1972 | Anthony ............ H03H 11/1217 324/76.83 |
| 4,306,301 A | 12/1981 | Geren et al. |

(Continued)

FOREIGN PATENT DOCUMENTS

| EP | 0 203 911 A2 | 12/1986 |
| GB | 612307 A | 11/1948 |

(Continued)

OTHER PUBLICATIONS

Nov. 20, 2012 International Search Report issued in International Application No. PCT/JP2012/075035 (with translation).

*Primary Examiner* — Kawing Chan
(74) *Attorney, Agent, or Firm* — Oliff PLC

(57) ABSTRACT

A resolver excitation apparatus that adjusts amplitude of a sinusoidal excitation source signal to generate an excitation signal having predetermined amplitude in order to excite an exciting winding of a resolver. A parallel resonant circuit having a parallel resonant element that functions as parallel resonant impedance for impedance of the excitation winding. A series resonant circuit having a series resonant element that functions as series resonant impedance for the impedance of the excitation winding.

13 Claims, 23 Drawing Sheets

(56) References Cited

U.S. PATENT DOCUMENTS

| | | | |
|---|---|---|---|
| 5,304,909 A | 4/1994 | Jin et al. | |
| 5,668,458 A * | 9/1997 | Ueda | H02K 19/36 |
| | | | 318/400.17 |
| 5,777,444 A * | 7/1998 | Motegi | H02N 2/142 |
| | | | 310/317 |
| 5,861,768 A | 1/1999 | Fujita et al. | |
| 5,867,023 A | 2/1999 | Karagiannis et al. | |
| 2011/0262112 A1 * | 10/2011 | Tanaka | G01P 3/48 |
| | | | 388/811 |

FOREIGN PATENT DOCUMENTS

| | | |
|---|---|---|
| JP | A-64-064550 | 3/1989 |
| JP | A-09-113205 | 5/1997 |
| JP | A-2009-180585 | 8/2009 |

\* cited by examiner

RESOLVER EXCITATION APPARATUS

TECHNICAL FIELD

The present invention relates to resolver excitation apparatuses that adjust the amplitude of a sinusoidal excitation source signal to generate an excitation signal having a predetermined amplitude in order to excite an excitation winding of a resolver.

BACKGROUND ART

Resolvers are sometimes used as a rotation detection sensor that detects rotation (the rotational speed or rotational position (angle of rotation) of a rotor) of a rotating electrical machine. The resolvers typically have an excitation winding on the stator side, and detect rotation of the rotating electrical machine based on a principle that the angle of rotation of a rotor is detected according to an output voltage induced to an output winding provided on the rotor side. Accordingly, an alternating current (AC) signal is normally applied to the excitation winding. An excitation apparatus that applies this AC signal has a sinusoidal oscillator circuit that generates a sinusoidal oscillation signal, and a driver circuit (e.g., amplifier circuit) that increases the amplitude of the sinusoidal oscillation signal to supply the resultant sinusoidal oscillation signal to the excitation winding. Japanese Patent Application Publication No. 2009-180585 (JP 2009-180585 A) (Patent Document 1) discloses an example, using as the driver circuit a series resonant circuit having a series resonant capacitor for the excitation winding of the resolver (Paragraph [0006], FIG. 5, etc.). According to Patent Document 1, capacitance of this capacitor and inductance of the excitation winding are set so as to increase the quality factor Q of the resonant circuit, and the amplitude of an excitation signal is adjusted by appropriately setting the frequency of the excitation signal. That is, the amplitude of the sinusoidal oscillation signal generated by the sinusoidal oscillator circuit is increased and applied to the excitation winding.

The excitation apparatus with such a configuration has a smaller circuit size and contributes to reduction in size and cost, as compared to the case of excitation apparatuses having an amplifier circuit using an operational amplifier etc. However, applying such a circuit requires conditions to be satisfied such as that the excitation winding has a sufficiently small direct current (DC) resistance component (i.e., the quality factor Q is high), and that the amplitude of the signal that is applied to the excitation winding is about the same as that of a power supply voltage of typical electronic circuits (e.g., about 5 [V] as shown in Patent Document 1) and the increase rate of the amplitude is relatively low.

On the other hand, in the resolvers that detect rotation of the rotating electrical machine used as a driving force source or a power source of hybrid cars, electric cars, etc. that have been increasingly demanded in recent years, the AC signal that is applied to the excitation winding is required to have a peak value (peak-to-peak) of about 20 to 30 [V]. Since a source signal of the excitation signal is generated by the typical electronic circuits, its peak value is about 2 to 3 [V], and a relatively high increase rate is required. The circuits that generate the source signal are often used for general purposes, and it is possible to select a single frequency for the excitation signal, but the frequency of the excitation signal is normally fixed to 10 [kHz], 20 [kHz], etc. in many cases. Accordingly, it is not practically easy to flexibly and appropriately set the frequency of the excitation signal as in Patent Document 1. The excitation apparatus that excites such a resolver therefore includes an amplifier circuit having an amplification factor of 10 in many cases.

A power supply having a relatively large power supply voltage range (about 25 to 35 [V]) is required in order that an excitation signal having a peak value of about 20 to 30 [V] is obtained. However, loss of the circuit tends to increase with an increase in power supply voltage. Accordingly, there are cases where the loss of the circuit (excitation apparatus) is reduced by adding a parallel resonant capacitor for the excitation winding to form a parallel resonant circuit. The loss is small if the excitation apparatus includes a power supply having a power supply voltage value optimal for the excitation apparatus, but otherwise the loss may increase. For example, if the voltage value of the power supply included in the excitation apparatus is higher than the optimal power supply voltage value, the loss is greater as the power supply voltage value is higher. If the voltage value of the power supply included in the excitation apparatus is lower than the optimal power supply voltage value, the excitation apparatus cannot provide a sinusoidal output having required amplitude, and provides an output having a waveform distorted with respect to the sinusoidal waveform.

RELATED ART DOCUMENT

Patent Document

[Patent Document 1] Japanese Patent Application Publication No. 2009-180585 (JP 2009-180585 A)

SUMMARY OF THE INVENTION

Problem to be Solved by the Invention

In view of the above background, it is desired to provide a technique that can be flexibly applied to a wide power supply voltage range, and that can apply a sinusoidal excitation signal having amplitude required for excitation to an excitation winding of a resolver by using a low-loss circuit configuration.

Means for Solving the Problem

In view of the above problem, a resolver excitation apparatus according to the present invention is a resolver excitation apparatus that adjusts amplitude of a sinusoidal excitation source signal to generate an excitation signal having predetermined amplitude in order to excite an exciting winding of a resolver, characterized by including: a parallel resonant circuit having a parallel resonant element that functions as parallel resonant impedance for impedance of the excitation winding; and a series resonant circuit having a series resonant element that functions as series resonant impedance for the impedance of the excitation winding.

As described above, a parallel resonant circuit is effective in reducing loss of the resolver excitation apparatus. In order to obtain amplitude required to excite the excitation winding, the amplitude of the excitation signal needs to be increased. In order to increase the amplitude of the excitation signal, however, a power supply voltage having a voltage range larger than a peak value of the excitation signal is required, and thus the resolver excitation apparatus cannot be flexibly applied to a wide range of the power supply voltage. Moreover, the higher the power supply voltage is, the greater the loss is. On the other hand, a series resonant circuit is capable of outputting the excitation signal having a peak value larger than the voltage range of the power supply voltage. In order to suppress the loss of the circuit, the power supply voltage need be optimized, and thus the resolver excitation apparatus cannot be flexibly applied to a wide range of the power supply voltage. When the resolver excitation apparatus includes the parallel resonant circuit and the series resonant circuit as in the above characteristic configuration, it is possible to generate the excitation signal having predetermined amplitude by combining characteristics of the series resonant circuit with, e.g., an amplifier, and to reduce the loss of the circuit by using the function of the parallel resonant circuit. That is, according to this characteristic configuration, the resolver excitation apparatus can be provided which can be flexibly applied to a wide power supply voltage range, and which can apply a sinusoidal excitation signal having amplitude required for excitation to the excitation winding of the resolver by using a low-loss circuit configuration.

A capacitive element (capacitor) and an inductive element (a coil or an inductor) can be used as the parallel resonant element and the series resonant element. In general, capacitive elements are widely used as compared to inductive elements, and the unit prices of parts are also lower for the capacitive elements than for the inductive elements. It is therefore preferable to use capacitive elements as the parallel resonant element and the series resonant element. In one form, in the resolver excitation apparatus according to the present invention, it is preferable that the parallel resonant circuit have a capacitive element connected in parallel with the excitation winding, and the series resonant circuit have a capacitive element connected in series with the excitation winding.

There are a plurality of possible combinations of the parallel resonant circuit and the series resonant circuit. In one form, in the resolver excitation apparatus according to the present invention, it is preferable that the series resonant element be connected to a parallel circuit of the parallel resonant element and the excitation winding. In this circuit configuration, an equivalent circuit of the parallel resonant circuit, the series resonant circuit, and the exciting winding is relatively simple, and circuit constants of the parallel resonant circuit and the series resonant circuit can be obtained by relatively simple computation. Specifically, in this resolver excitement apparatus, it is preferable that the circuit constant of the parallel resonant element be set according to a ratio of the amplitude of the excitation source signal to that of the excitation signal, and the circuit constant of the series resonant element be set so that a reactance component of load impedance as synthetic impedance of the excitation winding, the parallel resonant element, and the series resonant element is equal to zero.

As described above, there are a plurality of possible combinations of the parallel resonant circuit and the series resonant circuit. In addition to the above forms, the resolver excitation apparatus according to the present invention can be in such a form that the parallel resonant element is connected to a series circuit of the series resonant element and the excitation winding. In the resolver excitation apparatus having this circuit configuration, it is preferable that the circuit constant of the series resonant element be set according to a ratio of the amplitude of the excitation source signal to that of the excitation signal, and the circuit constant of the parallel resonant element be set so that a reactance component of load impedance as synthetic impedance of the excitation winding, the parallel resonant element, and the series resonant element is equal to zero.

The excitation source signal is generated by, e.g., outputting a discrete voltage value while the value is varied in a time series manner. That is, the excitation source signal sometimes has a stair-like waveform. In such a signal having a stair-like waveform, a signal having a frequency component (high frequency component) much higher than a fundamental component has been superimposed. Detection accuracy of the position of a magnetic pole may be decreased if this high frequency component remains in the excitation signal. Moreover, the high frequency component may increase radiation noise (emission noise). It is therefore desirable that such a high frequency component be reduced by the time the excitation source signal is output as the excitation signal. For example, it is preferable to add a noise filter to the circuit to attenuate the high frequency component. In one form, it is preferable that the resolver excitation apparatus according to the present invention further include: a feedback controller having an excitation source signal input line to which the excitation source signal is applied, and a feedback loop that feeds the excitation signal back to the excitation source signal input line, and performing feedback control to stabilize the amplitude of the excitation signal; and a band-pass filter that is placed in a preceding stage to a feedback point where the excitation signal is fed back, and that filters the excitation source signal.

It is preferable that the band-pass filter be formed so that a low-pass filter and a high-pass filter are arranged in this order from a preceding stage side toward the feedback controller. The low-pass filter can serve as a capacitive load for a circuit in a subsequent stage. The configuration in which the low pass filter serves as an input load for the feedback controller that is often formed by using an operational amplifier is not preferable in terms of circuit configurations. The band-pass filter can therefore be formed so that the low pass filter and the high-pass filter are arranged in this order from the preceding stage side, as described above.

BRIEF DESCRIPTION OF THE DRAWINGS

FIG. 3 shows illustrations showing comparison between a parallel resonant circuit and a series-parallel resonant circuit, where

FIG. 5 shows diagrams showing the relation between impedance and a current-voltage waveform of an excitation winding of the resolver, where

MODES FOR CARRYING OUT THE INVENTION

Figure 1:
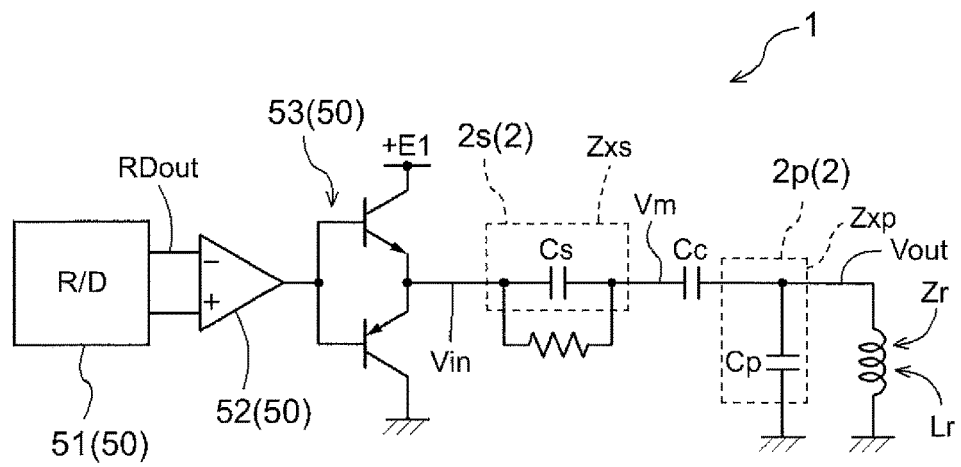
FIG. 1 is a schematic circuit diagram showing an excitation circuit of a series-parallel resonant resolver excitation apparatus.
Figure 2:
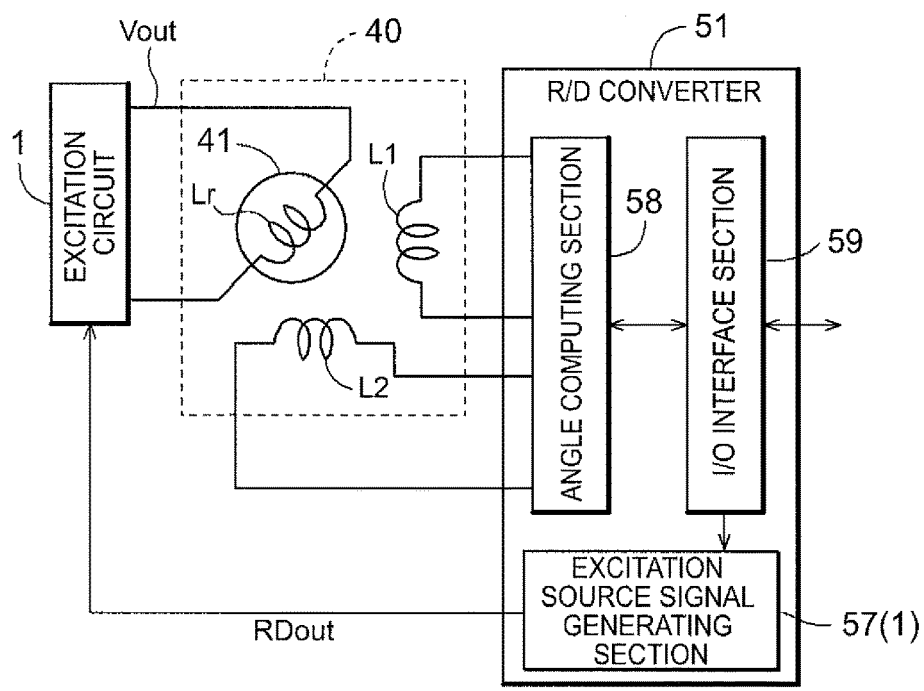
FIG. 2 is a block diagram schematically showing the relation among a resolver, an excitation circuit, and an RID capacitor.

Excitation circuits that are applied to a resolver excitation apparatus according to the present invention are shown by way of example with reference to the accompanying drawings to describe embodiments of the present invention. The schematic circuit diagram of FIG. 1 shows an excitation circuit 1 illustrating the subject matter of the present invention. The block diagram of FIG. 2 shows the relation among the excitation circuit 1, a resolver 40, and a resolver/digital converter (RID converter) 51 described below. In order to excite an excitation winding Lr of the resolver 40, the excitation circuit 1 (resolver excitation apparatus) adjusts the amplitude of a sinusoidal excitation source signal RDout to generate an excitation signal Vout having predetermined amplitude (e.g., corresponding to one half of a peak value "H" shown in FIG. 3). This excitation circuit 1 has: an excitation source signal supply section 50 having the RID converter 51 that outputs the excitation source signal RDout, a buffer section 52 that carries out impedance transformation of the excitation source signal RDout etc., and a current amplifier circuit 53; a resonant section 2 that resonates with the excitation winding Lr of the resolver; and a coupling capacitor Cc.

The resonant section 2 has a series resonant element 2s functioning as series resonant impedance Zxs for impedance Zr of the excitation winding Lr, and a parallel resonant element 2p functioning as parallel resonant impedance Zxp for the impedance Zr of the excitation winding Lr. That is, the excitation circuit 1 includes a parallel resonant section having the parallel resonant element 2p functioning as the parallel resonant impedance Zxp for the impedance Zr of the excitation winding Lr, and a series resonant section having the series resonant element 2s functioning as the series resonant impedance Zxs for the impedance Zr of the excitation winding Lr. In other words, the excitation circuit 1 includes: a parallel resonant circuit formed by the excitation winding Lr and the parallel resonant section having the parallel resonant element $2p$; and a series resonant circuit formed by the excitation winding Lr and the series resonant section having the series resonant element $2s$. A resistor connected in parallel with the series resonant element $2s$ in FIG. 1 (and FIG. 3B) is provided in order to set a suitable time constant for charging the coupling capacitor Cc when the power is turned on, and to suppress a shift of a DC operating point which is caused by a leakage current of the coupling capacitor Cc.

The resolver 40 has the excitation winding Lr provided in a resolver rotor 41, and two detection windings (L1, L2) arranged so as to electrically have a phase difference of 90 degrees from each other. The resolver 40 is a rotation detection sensor capable of detecting the rotation state (the rotational speed or rotational position (angle of rotation)) of an object to be detected (e.g., a rotor of a rotating electrical machine) which rotates in synchronization with a rotor (resolver rotor 41) based on a voltage induced on detection windings (L1, L2) of a plurality of stators according to a voltage applied to the excitation winding Lr of the rotor. Specifically, the resolver 40 detects the rotation state of the object to be detected, based on the correlation between signals induced on the two detection windings (L1, L2) and having different phases according to rotation of the resolver rotor 41. The R/D converter 51 contains an angle computing section 58, and computes the angle of rotation (electrical angle) of the resolver rotor 41 based on detection signal obtained from the two detection windings (L1, L2). This angle of rotation is provided in the form of digital data to an external control apparatus etc. via an input/output (I/O) interface section 59. The R/D converter 51 further includes an excitation source signal generating section 57 that generates the excitation source signal RDout as a source of the excitation signal that excites the excitation winding Lr.

The excitation source signal RDout is, e.g., a sinusoidal signal having a peak value (peak-to-peak) of 2 [V] and a frequency of 10 [kHz] to 20 [kHz] (hereinafter the peak value is denoted by "2 [Vp-p]" etc. as appropriate). Typically, a sinusoidal signal having a peak value of 20 [Vp-p] is required in order to excite the excitation winding Lr of the resolver 40. Accordingly, as an example, the excitation circuit 1 adjusts the amplitude of the excitation source signal RDout of 2 [Vp-p] provided by the R/D converter 51 to generate the excitation signal Vout of 20 [Vp-p]. The present invention is characterized by the configuration of this excitation circuit 1 (resolver excitation apparatus).

FIG. 3 shows illustrations showing comparison between a conventional excitation circuit 100 (FIG. 3A) and the excitation circuit 1 (FIG. 3B) according to the present invention. An example will be described in which the resolver 40 is used in an application of detecting rotation of a rotating electrical machine used as a driving source of a vehicle. Typical vehicles have mounted thereon a battery having a power supply voltage of 12 V, and the excitation circuit (1, 100) can use this battery as a DC voltage source. However, a power supply voltage range Epp is not large enough to generate the excitation signal Vout of 20 [Vp-p].

Some vehicles using a rotating electrical machine as a driving source have, e.g., a power supply of about 18 V as a power supply for other sensors such as a current sensor that detects a current flowing in a coil of the rotating electrical machine, and such a power supply can be used for the excitation circuit 1. However, the power supply voltage range is still not large enough to generate the excitation signal Vout of 20 [Vp-p]. Accordingly, in some cases, a negative power supply (−E2=−12 [V]) is produced by using the 12 [V] power supply of the battery, and a DC power supply having a power supply voltage range Epp2 (Epp) of 30 [Vp-p] is formed by using this negative power supply together with the power supply (+E1=+18[V]) for the sensors.

Figure 3A:
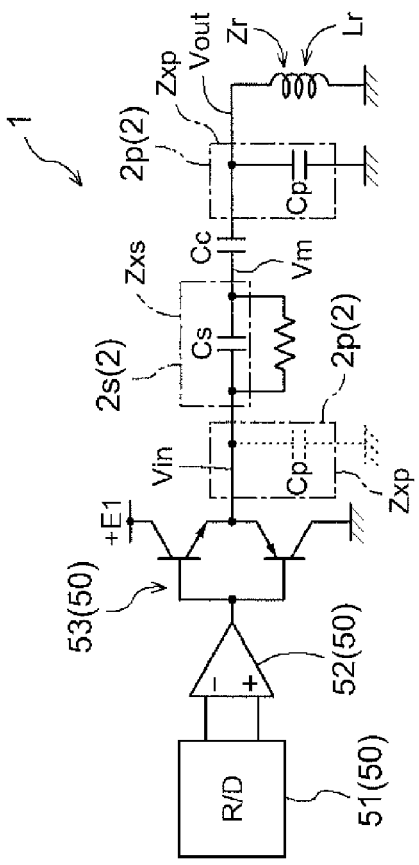
FIG. 3A is a schematic circuit diagram of the parallel resonant excitation circuit.

The conventional excitation circuit 100 shown in FIG. 3A is a circuit that is driven by both the positive and negative power supplies (+E1 to −E2) thus produced. As shown in FIG. 3A, an excitation source signal Yin that is output from the excitation source signal supply section 50 has a peak value H required for the excitation signal Vout (e.g., 20 [Vp-p]), and the excitation signal Vout is output to the excitation winding Lr with this peak value H being retained. In the conventional excitation circuit 100, a parallel resonant section (resonant section 102) using a parallel resonant capacitor Cp is formed for the excitation winding Lr to reduce loss of the circuit.

Figure 3B:
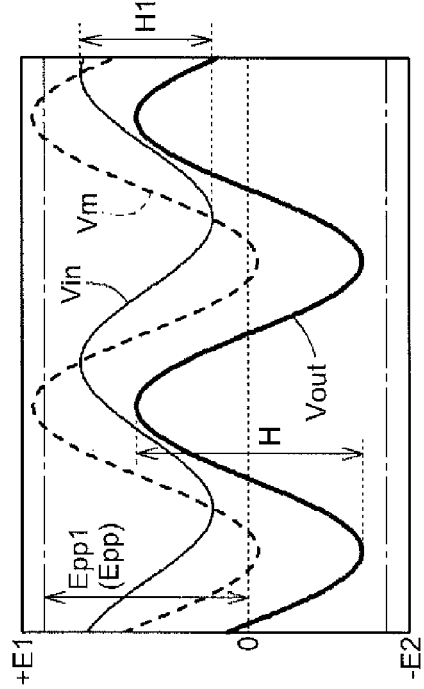
FIG. 3B is a schematic circuit diagram of the series-parallel resonant excitation circuit.

On the other hand, no negative supply is used for the excitation circuit 1 of the present invention shown in FIG. 3B, and the power supply voltage range Epp1 (Epp) is "+E1 to 0" (18 [Vp-p]). A peak value H1 of the excitation source signal Vin that is output from the excitation source signal supply section 50 to the resonant section 2 is therefore much smaller (e.g., about 12 [Vp-p]) than the peak value H required for output. However, the excitation signal Vout having the required peak value H is generated after this excitation source signal Vin passes through the resonant section 2. More specifically, this excitation source signal Vin turns into a signal (Vm) having a peak value (e.g., H: 20 V [p-p]) larger than the power supply voltage range Epp1 (e.g., 18 [Vp-p]) after it passes through the series resonant element $2s$ of the resonant section 2. The excitation signal Vout having the peak value H is output to the excitation winding Lr via the coupling capacitor Cc. The parallel resonant section using the parallel resonant element $2p$ is formed in the resonant section 2 of the excitation circuit 1 to reduce loss of the excitation circuit 1. The parallel resonant element $2p$ need not necessarily be provided on the excitation winding Lr side with respect to the coupling capacitor Cc, but may be provided, e.g., between the current amplifier circuit 53 and the series resonant element $2s$ as shown by broken line in FIG. 3B (corresponding to a second circuit example 12, a fifth circuit example 15, a sixth circuit example 16, etc. described below with reference to FIGS. 12, 26, and 29).

Figure 3C:
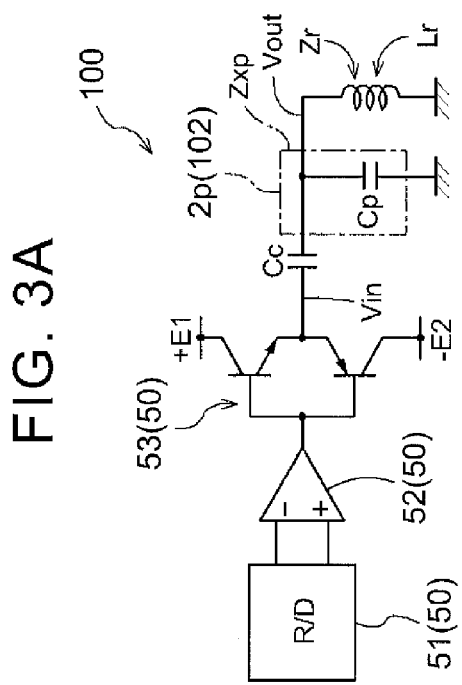
FIG. 3C is a, waveform chart showing characteristics of the parallel resonant excitation circuit.
Figure 3D:
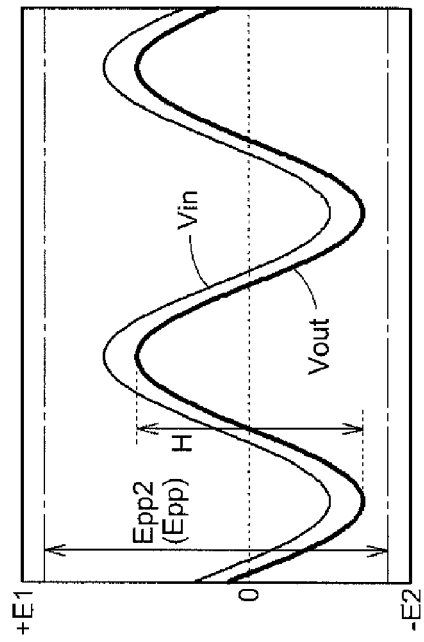
FIG. 3D is a waveform chart showing characteristics of the series-parallel resonant excitation circuit.

Comparison between FIG. 3C showing characteristics of the conventional excitation circuit 100 and FIG. 3D showing characteristics of the excitation circuit 1 of the present invention shows that, in either case, the excitation signal Vout having the same waveform is generated and provided to the excitation winding Lr. That is, the excitation circuit 1 of the present invention is capable of generating and outputting, without using at least a negative power supply, the same excitation signal Vout as the conventional excitation circuit 100 that uses a negative power supply. The circuit configuration is therefore simplified, and reduction in cost can be achieved. Although not described in FIG. 3, the excitation circuit 1 is advantageous in that loss of the circuit is sufficiently reduced as in the case where the power supply voltage is set to an optimal value in the conventional excitation circuit 100.

Characteristics of the excitation circuit 1 of the present invention will be described in detail below by using specific circuit examples. As described above, the excitation circuit 1 of the present invention is capable of generating the excitation signal Vout having a predetermined peak value H by not using both positive and negative power supplies. In order to focus on the characteristics of the invention, simplified circuits having both positive and negative power supplies (±E) will first be described by way of example (FIGS. 4 to 31). More practical circuit configurations (circuit configurations with a single power supply) will be described below according to the simplified circuit examples (FIGS. 33 to 39).

Figure 4:
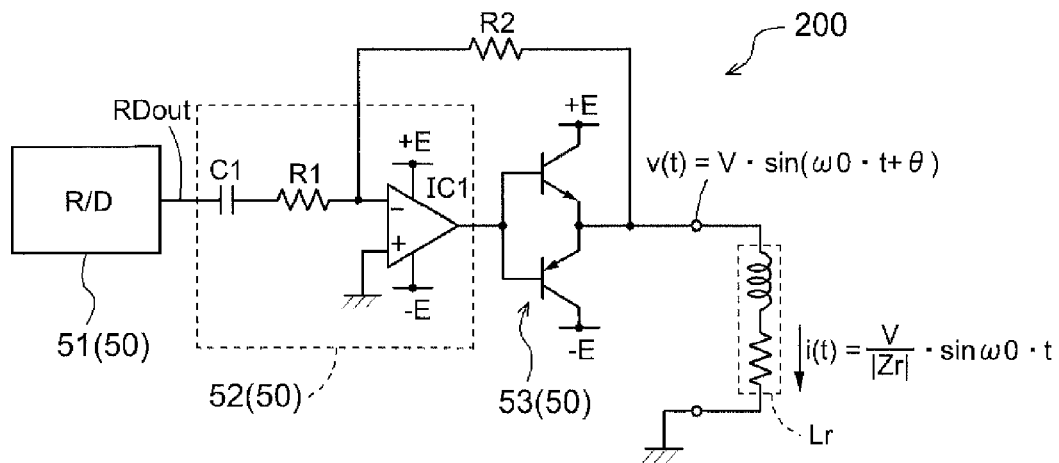
FIG. 4 is a schematic circuit diagram showing an example of a basic circuit of an excitation circuit having no resonant circuit.

First, loss of the circuit will be described with reference to FIG. 4 showing an excitation circuit 200 having no resonant section 2, that is, an example of a basic circuit of the excitation circuit. In this excitation circuit 200, a buffer section 52 is configured by using an operational amplifier IC1 as a core. This operational amplifier IC1 functions as an impedance converter of the excitation source signal RDout that is output from the RID converter 51, and also functions as a feedback controller that stabilizes the amplitude of the excitation signal Vout that is fed back via a resistor (feedback resistance R2). A capacitor C1 is a coupling capacitor that transmits only an AC component of the excitation source signal RDout to the operational amplifier IC1, and a resistor R1 is an input resistor of the operational amplifier IC. The function of the buffer section 52 such as the operational amplifier IC1 and R2 is similar to that in each circuit example of the excitation circuit 1 of the present invention which will be described below. As shown in FIG. 4, in the basic circuit (excitation circuit 200), the excitation source signal Vin after current amplification is the same signal as the excitation signal Vout that is applied to the excitation winding Lr. The excitation signal Vout (excitation voltage v(t)) can be given by the following Expression (1), where "V" represents amplitude.

[Expression 1]

$$V\text{out}=v(t)=V \cdot \sin(\omega 0 \cdot t + \theta) \quad (1)$$

Figure 5A:
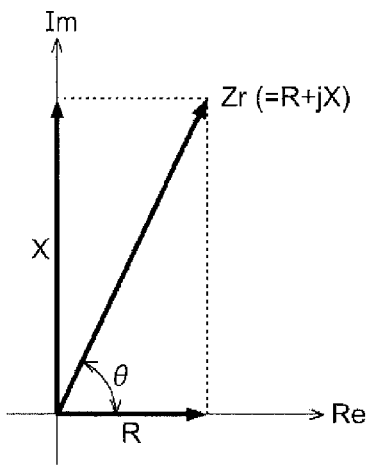
FIG. 5A is a vector diagram of the impedance of the excitation winding.
Figure 5B:
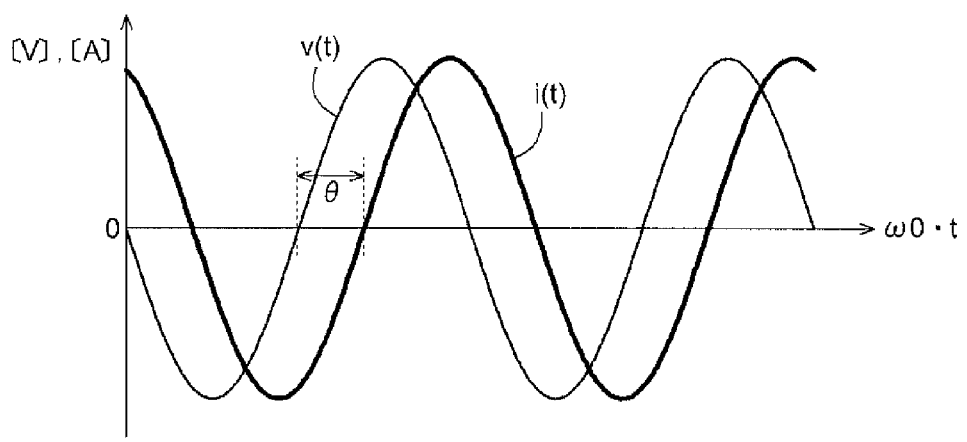
FIG. 5B is a current-voltage waveform chart.

In the above Expression (1), "ω0" represents an excitation angular frequency, and is given by "ω0=2π·f0," where "f0" represents an excitation frequency. As shown in FIG. 5A, "θ" represents a phase angle of the impedance Zr of the excitation winding Lr in a complex plane (Gaussian plane) as an orthogonal vector space of an imaginary axis Im and a real axis Re. As shown in FIG. 5B, "θ" corresponds to the phase difference between the voltage (excitation voltage v(t)) and the current (excitation current i(t)) of the excitation signal Vout. An equivalent circuit of the excitation winding Lr is formed by a resistor and a coil (inductor) as shown in FIG. 4. The impedance Zr of the excitation winding Lr therefore has a resistance component "R" (component "R" on the real axis Re in the complex plane) and a reactance component "X" (component "jX" on the imaginary axis Im in the complex plane). "X" is given by "X=ω0·L" by using the inductance "L" of the excitation winding Lr. As shown in FIG. 5A, the angle between a vector of "Zr" as complex impedance and the real axis Re is the phase angle θ. Loss P for one current amplifying element (transistor) of the current amplifier circuit 53 in one cycle T (=2π/ω0) of the excitation signal Vout can be estimated as shown by the following Expression (2). Loss that is caused by the base current of the transistor is herein not taken into consideration.

[Expression 2]

$$P = \frac{1}{T}\int_0^{\frac{T}{2}} \{(E-v(t)) \cdot i(t)\} dt = \frac{1}{\pi} \cdot \frac{E \cdot V}{|Zr|} - \cos\theta \cdot \frac{V^2}{4 \cdot |Zr|} \quad (2)$$

The current amplifying element typically tends to account for a large proportion of loss of the excitation circuit. Accordingly, reducing loss in the current amplifying element can significantly reduce the loss of the circuit. The above Expression (2) shows that, in order to reduce the loss of the excitation circuit 200, it is preferable to

[1] increase the absolute value of the impedance Zr (load impedance) of the excitation winding Lr as viewed from the excitation circuit side, and

[2] make the phase angle θ closer to "0" (make the value of "cos θ" closer to "1") to increase the value of the second term on the right side of Expression (2).

Figure 6:
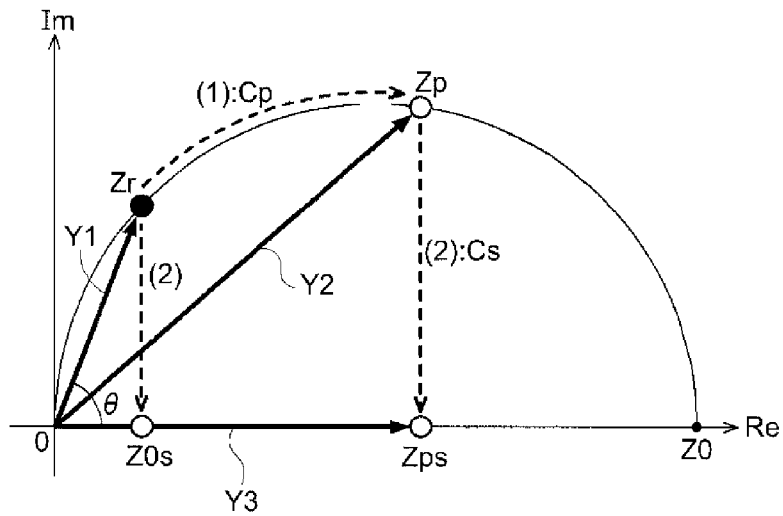
FIG. 6 is a vector diagram showing the principle of adjusting load impedance by series-parallel resonance.
Figure 7:
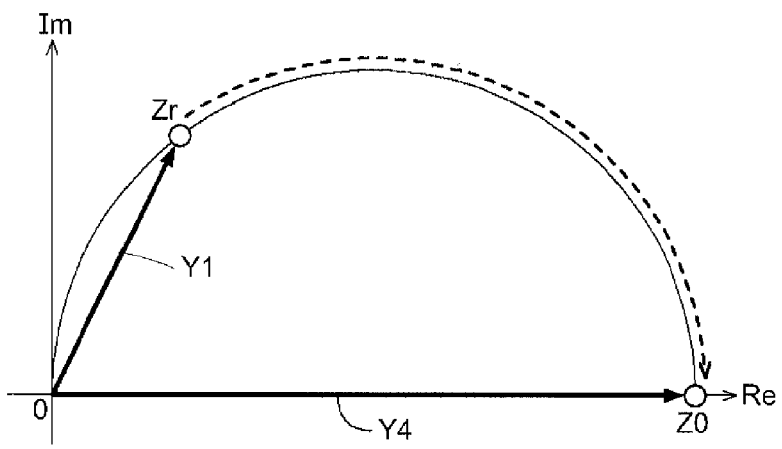
FIG. 7 is a vector diagram showing the principle of adjusting load impedance by parallel resonance.
Figure 8:
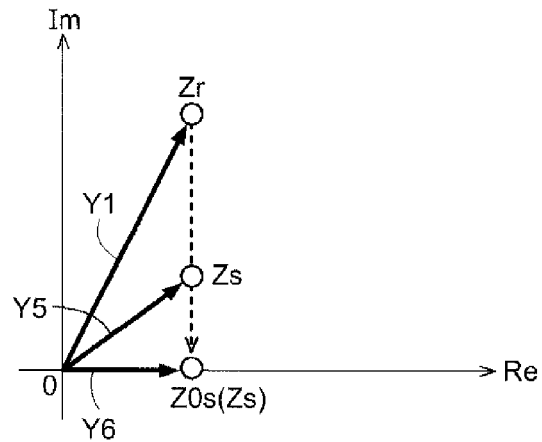
FIG. 8 is a vector diagram showing the principle of adjusting load impedance by series resonance.

For example, in the case where the impedance Zr of the excitation winding Lr is shown by a vector Y1 on a complex plane shown in FIG. 6, moving the tip of the vector Y1 along the circumference of a semicircle shown in FIG. 6 as shown by (1) increases the absolute value of the vector of the impedance. That is, the absolute value of impedance Zp shown by a vector Y2 is larger than that of the impedance Zr of the excitation winding Lr. That is, the absolute value of the impedance Zr of the excitation winding Lr as viewed from the excitation circuit side can be increased. Such movement of the vector can be implemented by such a parallel resonant element 2p as shown in FIG. 1, more specifically, the parallel resonant capacitor Cp. The semicircle in FIG. 6 shows a circumference (semicircular arc) having its center on the real axis Re and passing through the origin of the complex plane, a parallel resonance point (impedance Z0), and the impedance Zr of the excitation winding Lr. In FIG. 6, the impedance Z0 shows the impedance at a parallel resonant point of the parallel resonant capacitor Cp and the excitation winding Lr, and is given by the following Expression (3-1). "C0," which represents a value at the parallel resonant point of the parallel resonant capacitor Cp, is given by the following Expression (3-2).

[Expression 3]

$$Z0 = \frac{R^2 + \omega 0^2 \cdot L^2}{R} \quad (3\text{-}1)$$

$$C0 = \frac{L}{R^2 + \omega 0^2 \cdot L^2} \quad (3\text{-}2)$$

In FIG. 6, if the tip of the vector Y1 or the vector Y2 is moved in the direction toward the real axis Re along the imaginary axis Im as shown by (2), the value of the phase angle θ gradually decreases from "θr" and becomes equal to "0" when the tip of the vector reaches the real axis Re. That is, the phase angle θ can be made closer to "0" (the value of "cos θ" can be made closer to "1") to increase the value of the second term on the right side of the above Expression (2). Such movement of the vector can be implemented by such a series resonant element 2s as shown in FIG. 1, more specifically, a series resonant capacitor Cs. In FIG. 6, impedance Z0s shows a series resonant point of the series resonant capacitor Cs and the excitation winding Lr.

As shown in FIG. 6, the impedance Zr of the excitation winding Lr can be converted to synthetic impedance "Zp"

by the parallel resonant capacitor Cp, and this impedance "Zp" can further be converted to synthetic impedance "Zps" by the series resonant capacitor Cs. The impedance of the excitation winding Lr as viewed from the excitation circuit 1 can thus be changed by the resonant section 2 (the parallel resonant capacitor Cp and the series resonant capacitor Cs). The impedance of the excitation winding Lr as viewed from the excitation circuit 1 including the resonant section 2 is referred to as the "load impedance."

As described above, providing such a parallel resonant section having the parallel resonant element 2p and such a series resonant section having the series resonant element 2s as shown in FIG. 1 as the resonant section 2 in the excitation circuit 1 can significantly reduce the loss of the current amplifying element. As described in detail below, the increase ratio of the excitation signal Vout to the excitation source signal Vin after current amplification is determined by the ratio of the vector Y2 to a vector Y3 as shown in FIG. 6. Accordingly, the excitation circuit 1 of the present invention which is described above and generally shown in FIG. 1 can form an excellent excitation apparatus with the power supply voltage range Epp being suppressed to a practical range and with loss of the circuit being sufficiently reduced. The power supply voltage range Epp can be any value in a predetermined range defined by the power supply voltage, the impedance Zr of the excitation winding Lr, etc. (e.g., preferably in a range given by Expression (4-3) shown below).

In the present embodiment, the excitation source signal RDout generated by the excitation source signal generating section 57 of the R/D converter 51 turns into the excitation source signal Vin after current amplification, through the buffer section 52 and the current amplifier circuit 53, and the resonant section 2 acts on this excitation source signal Vin. That is, the excitation source signal as viewed from the resonant section 2 and the excitation winding Lr as a "load" is "Yin" in the present embodiment. However, the buffer section 52 and the current amplifier circuit 53 for current amplification need not necessarily be included in the excitation source signal supply section 50, and the excitation source signal supply section 50 may be configured so as to have only the excitation source signal generating section 57. The excitation source signal according to the concept of the present invention therefore includes both "RDout" and "Vin." For example, in the case where the buffer section 52 and the current amplifier circuit 53 for current amplification are not included in the excitation source signal supply section 50, the present invention may be configured so that the increase ratio of the excitation signal Vout to the excitation source signal RDout output from the R/D converter 51 is determined by the ratio of the vector Y2 to the vector Y3 as shown in FIG. 6.

Figure 12:
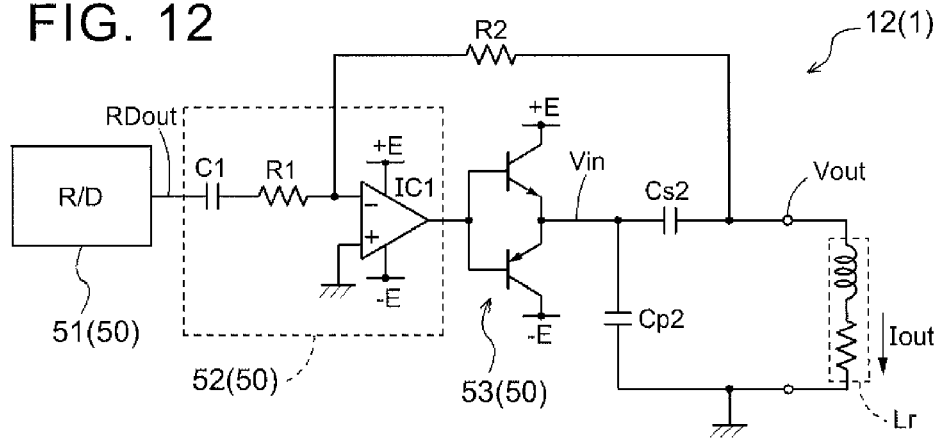
FIG. 12 is a schematic circuit diagram of a second circuit example of the excitation circuit.
Figure 13:
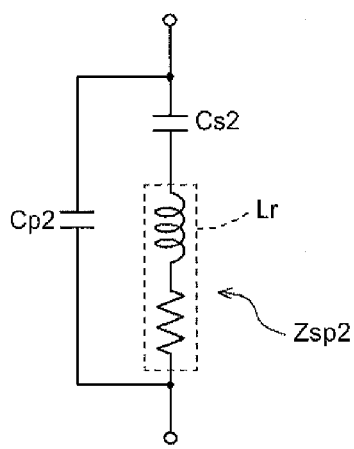
FIG. 13 is an equivalent circuit diagram of load impedance of the second circuit example.
Figure 14:
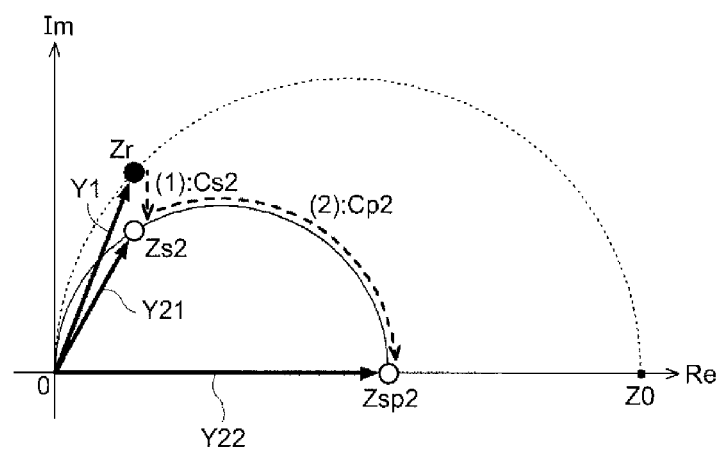
FIG. 14 is a vector diagram showing a method for adjusting the load impedance according to the second circuit example.

FIG. 6 shows an example in which the vector of the impedance is moved from "Y1" to "Y2" by the function of the parallel resonant capacitor Cp, and is further moved to "Y3" by the function of the series resonant capacitor Cs so that the imaginary component (reactance component) becomes equal to "0." However, the present invention is not limited to this example, and the vector may be moved by the function of the series resonant capacitor Cs so that the vector still has the imaginary component, and may further be moved by the function of the parallel resonant capacitor Cp so that the imaginary component becomes equal to "0." A circuit configuration example and a vector diagram in this case will be described later (FIGS. 12 to 14 etc.). Although FIG. 6 shows an example in which the vector of the impedance is moved by using the capacitor (capacitive element), the reactance component that moves the vector is not limited to the capacitor, and an inductor (inductive element) may be used. Circuit configuration examples using an inductor will be described below (FIGS. 19 to 31 etc.).

Looking only at the above condition [2] that "the phase angle θ is made closer to "0" (the value of "cos θ" is made closer to "1") to increase the value of the second term on the right side of Expression (2)," the power supply voltage range Epp required in this case will be considered. First, an example in which only the parallel resonant capacitor Cp affects the load impedance will be considered as an extreme example. As shown in a complex plane of FIG. 7, the phase angle θ becomes equal to "0" as the vector Y1 of the impedance Zr of the excitation winding Lr as viewed from the excitation circuit side is moved along a circumference to a vector Y4 until the reactance component becomes equal to "0" (to the parallel resonant point (impedance Z0)).

In this case, the operation of increasing the amplitude of the excitation source signal RDout need be performed entirely by the excitation source signal supply section 50 (current amplifier circuit 53), and the power supply voltage range Epp is required to have at least the peak value H of the excitation signal Vout. However, a drop-out voltage Vd is produced for the emitter-collector voltage of the current amplifying element formed by, e.g., a transistor due to the influence of a forward voltage of a diode between the base and the emitter, etc. A voltage as the sum of the drop-out voltage Vd and the excitation signal Vout for both positive and negative power supplies is therefore required for the power supply voltage range Epp that is applied between the positive and negative terminals of the current amplifier circuit 53. For example, the power supply voltage range Epp is required to have the following value, where "V" represents the amplitude of the excitation signal Vout.

$$Epp: \pm(V+Vd) \quad (4\text{-}1)$$

An example in which only the series resonant capacitor Cs affects the load impedance will be considered as another extreme example. As shown in a complex plane of FIG. 8, if the vector Y1 of the impedance Zr of the excitation winding Lr as viewed from the excitation circuit side is moved along the imaginary axis Im in such a direction that the reactance component is reduced (the direction in which the reactance component becomes equal to "0," namely the direction toward the series resonant point of the impedance "Z0s") to a vector Y6, the phase angle θ is "0."

In this case, the increase ratio of the amplitude of the excitation signal Vout to that of the excitation source signal Vin after current amplification is determined by the ratio of the magnitude of the vector that has not been moved to the magnitude of the vector that has been moved. That is, this increase ratio is determined by the ratio (|Zr|/|Zs|) of the magnitude of the impedance Zr of the excitation winding Lr to that of the load impedance Zs obtained by the series resonant capacitor Cs. The power supply voltage range Epp that is applied between the positive and negative terminals of the current amplifier circuit 53 can be suppressed to a value smaller than the peak value H of the excitation signal Vout in view of this increase ratio. Specifically, the power supply voltage range Epp is given by the following Expression (4-2), where "R" represents a resistance component of the impedance Zr.

[Expression 4]

$$Epp: \pm \left(V \cdot \frac{R}{|Zr|} + Vd\right) \quad (4\text{-}2)$$

The excitation circuit 1 of the present invention which is described above and generally shown in FIG. 1 uses both the parallel resonant element 2p and the series resonant element 2s. That is, the excitation circuit 1 of the present invention can form an excellent resolver excitation apparatus with the power supply voltage range Epp being suppressed to a practical range and with loss of the circuit being sufficiently reduced. From a standpoint of the power supply voltage range Epp, the excitation circuit 1 of the present invention can be most effectively applied in the case where the power supply voltage range Epp is implemented by both positive and negative power supplies ±E and the power supply voltage "E" is in the range given by the following Expression (4-3).

$$\{V \cdot (R/|Zr|)\} + Vd < E < V + Vd \quad (4\text{-}3)$$

Specific configuration examples of the excitation circuit 1 according to the present invention, which are preferable when the power supply voltage "E" is in the range given by Expression (4-3), will be described below.

Figure 9:
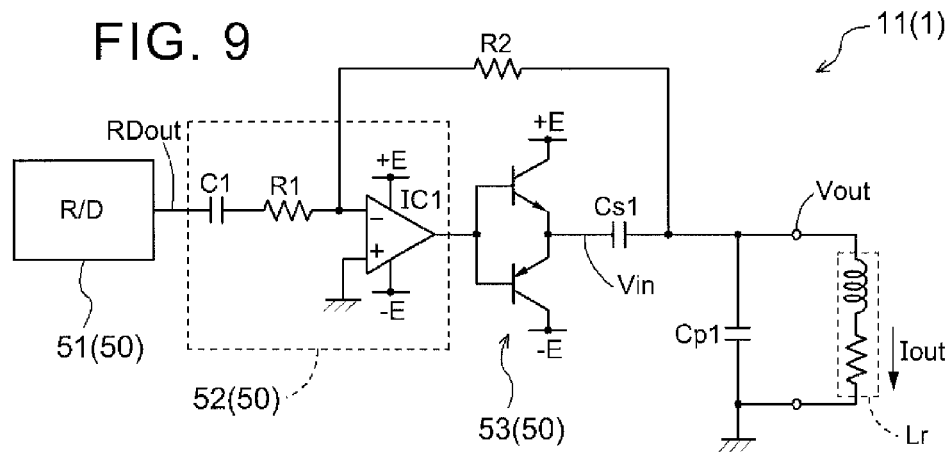
FIG. 9 is a schematic circuit diagram of a first circuit example of the excitation circuit.
Figure 10:
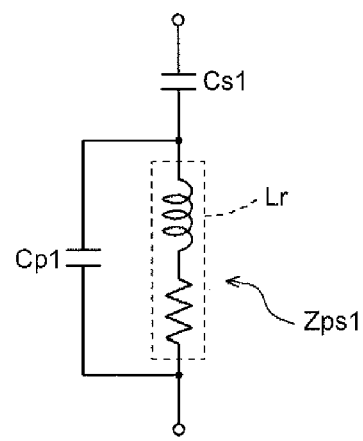
FIG. 10 is an equivalent circuit diagram of load impedance of the first circuit example.
Figure 11:
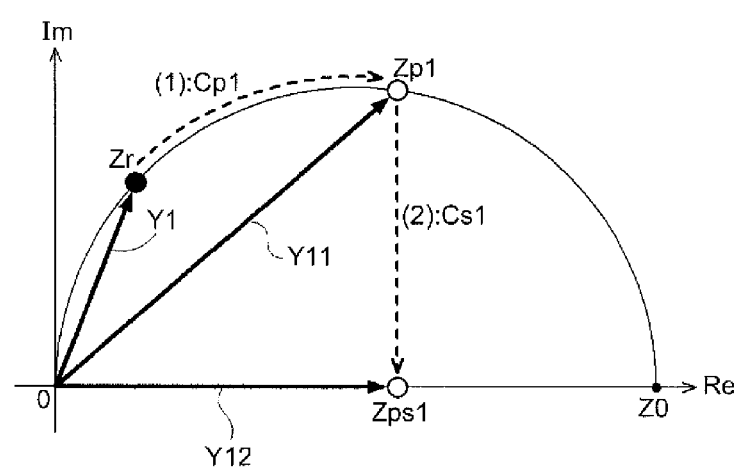
FIG. 11 is a vector diagram showing the principle of adjusting load impedance according to the first circuit example.

FIG. 9 is a schematic circuit diagram showing a first circuit example 11 of the excitation circuit 1 of the present invention. FIG. 10 is an equivalent circuit diagram of load impedance Zps1 (synthetic impedance of the excitation winding Lr, the series resonant capacitor Cs1, and the parallel resonant capacitor Cp1) as viewed from the excitation circuit 1 in the first circuit example 11. FIG. 11 is a vector diagram in a complex plane, showing the relation between the impedance Zr of the excitation winding Lr and the load impedance Zps1 of the first circuit example 11. As shown in FIGS. 9 and 10, the first circuit example 11 is configured so that a series resonant capacitor Cs1 corresponding to the series resonant element 2s is connected to a parallel circuit of a parallel resonant capacitor Cp1 corresponding to the parallel resonant element 2p and the excitation winding Lr. With such a circuit configuration, as shown in FIG. 11, the vector Y1 of the impedance of the excitation winding Lr is moved along a circumference to a vector Y11 by the function of the parallel resonant capacitor Cp1, and is further moved in the direction toward the real axis Re along the imaginary axis Im to a vector Y12 by the function of the series resonant capacitor Cs1. In this example, the vector Y12 is a vector whose imaginary component is "0." Respective circuit constants of the parallel resonant capacitor Cp1 and the series resonant capacitor Cs1 are selected so that the imaginary component of the load impedance Zps1 is "0" and that the following Expression (5) is satisfied.

[Expression 5]

$$\frac{V}{E - Vd} = \frac{|Zp1|}{|Zps1|} \quad (5)$$

The right side of Expression (5) shows the ratio of the magnitude of the vector Y11 to that of the vector Y12 in the complex plane of FIG. 11. That is, Expression (5) shows the ratio of the magnitude (absolute value) of the load impedance that has not been changed by the series resonant capacitor Cs1 to that of the load impedance that has been changed by the series resonant capacitor Cs1. This ratio shows the increase rate of the excitation signal Vout with respect to the excitation source signal Vin after current amplification. That is, the circuit constants of the parallel resonant capacitor Cp1 and the series resonant capacitor Cs1 are set so that the amplitude of the excitation signal Vout can be ensured and loss of the excitation circuit 1 can be suppressed for the given power supply voltage "±E." Although detailed calculation is omitted, the circuit constants of the parallel resonant capacitor Cp1 and the series resonant capacitor Cs1 can be set by the following Expressions (6-1) and (6-2), where "ω0" represents an excitation angular frequency as described above, and "Z0" and "C0" represent the impedance and the value of the parallel resonant capacitor Cp1 at the parallel resonant point, respectively, as shown by Expressions (3-1) and (3-2).

[Expression 6]

$$Cp1 = C0 - \frac{1}{\omega 0 \cdot Z0} \sqrt{\left(\frac{V}{E - Vd}\right)^2 - 1} \quad (6\text{-}1)$$

$$Cs1 = \frac{1 + \omega 0^2 \cdot Z0^2 (C0 - Cp1)^2}{\omega 0^2 \cdot Z0^2 (C0 - Cp1)} \quad (6\text{-}2)$$

As can be seen from FIG. 11 and Expressions (5) and (6-1), in the first circuit example 11, the circuit constant of the parallel resonant capacitor Cp1 corresponding to the parallel resonant element 2p is set according to the ratio of the amplitude of the excitation source signal Vin to that of the excitation signal Vout. As can be seen from FIG. 11, the circuit constant of the series resonant capacitor Cs1 corresponding to the series resonant element 2s is set so that the reactance component of the load impedance as synthetic impedance of the excitation winding Lr, the parallel resonant element 2p (Cp1), and the series resonant element 2s (Cs1) is zero.

FIG. 12 is a schematic circuit diagram showing a second circuit example 12 of the excitation circuit 1 of the present invention. FIG. 13 is an equivalent circuit diagram of load impedance Zsp2 as viewed from the excitation circuit 1 in the second circuit example 12. FIG. 14 is a vector diagram in a complex plane, showing the relation between the load impedance (impedance Zr of the excitation winding Lr) of the basic circuit shown in FIG. 4 and the load impedance Zsp2 of the second circuit example 12. As shown in FIGS. 12 and 13, the second circuit example 12 is configured so that a parallel resonant capacitor Cp1 corresponding to the parallel resonant element 2p is connected to a series circuit of a series resonant capacitor Cs2 corresponding to the series resonant element 2s and the excitation winding Lr. With such a circuit configuration, as shown in FIG. 14, the vector Y1 of the impedance of the excitation winding Lr is moved in the direction toward the real axis Re along the imaginary axis Im to a vector Y21 by the function of the series resonant capacitor Cs1. The vector Y21 is further moved along a circumference to a vector Y22 by the function of the parallel resonant capacitor Cp2. The vector Y22 is a vector whose imaginary component is "0." The load impedance Zsp2 shown by the vector Y22 corresponds to impedance at the parallel resonant point of load impedance Zs2 shown by the vector Y21 and the parallel resonant capacitor Cp2.

As shown in FIG. 14, in this case, the vector locus from the vector Y21 to the vector Y22 is located on a circumference that is disposed inside a circle passing through the impedance Zr of the excitation winding Lr, the parallel resonant point for the impedance Zr, and the origin of the complex plane. Specifically, this inner circle is a circle having its center on the real axis Re and passing through the origin of the complex plane and the load impedance Zs2 shown by the vector Y21. The series resonant capacitor Cs2 and the parallel resonant capacitor Cp2 are selected so that the component on the imaginary axis Im of the load impedance Zsp2 is "0" and that the following Expression (7) is satisfied.

[Expression 7]

$$\frac{V}{E-Vd} = \frac{|Zr|}{|Zs2|} \quad (7)$$

The right side of Expression (7) shows the ratio of the magnitude of the vector Y1 to that of the vector Y21 in the complex plane of FIG. 14. That is, Expression (7) shows the ratio of the magnitude (absolute value) of the load impedance that has not been changed by the series resonant capacitor Cs2 to that of the load impedance that has been changed by the series resonant capacitor Cs2. This ratio shows the increase rate of the excitation signal Vout with respect to the excitation source signal Vin after current amplification. That is, the respective circuit constants of the series resonant capacitor Cs2 and the parallel resonant capacitor Cp 1 are set so that the amplitude of the excitation signal Vout can be ensured and loss of the excitation circuit 1 can be suppressed for the given power supply voltage "±E." Although detailed calculation is omitted, the circuit constants of the series resonant capacitor Cs2 and the parallel resonant capacitor Cp2 can be set by the following Expressions (8-1) and (8-2), respectively.

[Expression 8]

$$Cs2 = \frac{1 + \omega0^2 \cdot Z0^2 \cdot C0^2}{\omega0^2 \cdot Z0^2 \cdot C0 - \omega0 \cdot Z0 \sqrt{\left(\frac{E-Vd}{V}\right)^2 \cdot (1 + \omega0^2 \cdot Z0^2 \cdot C0^2) - 1}} \quad (8-1)$$

$$Cp2 = \frac{Cs2 \cdot (1 + \omega0^2 \cdot Z0^2 \cdot C0^2) \cdot \{\omega0^2 \cdot Z0^2 \cdot C0 \cdot (Cs2 - C0) - 1\}}{\omega0^2 \cdot Z0^2 \cdot Cs2^2 + \{\omega0^2 \cdot Z0^2 \cdot C0 \cdot (Cs2 - C0) - 1\}^2} \quad (8-2)$$

As can be seen from FIG. 14, the circuit constant of the series resonant capacitor Cs2 corresponding to the series resonant element 2s is set according to the ratio of the amplitude of the excitation source signal Yin to that of the excitation signal Vout. As can be seen from FIG. 14 and Expressions (7) and (8-2), the circuit constant of the parallel resonant capacitor Cp2 corresponding to the parallel resonant element 2p is set so that the reactance component of the load impedance as synthetic impedance of the excitation winding Lr, the parallel resonant element 2p (Cp2), and the series resonant element 2s (Cs2) is "0."

Figure 15:
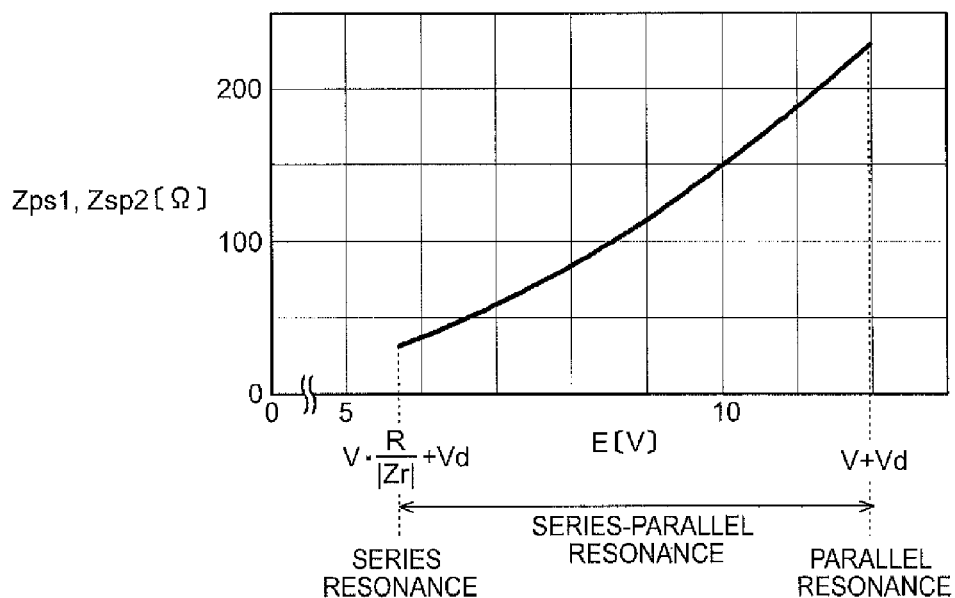
FIG. 15 is a graph showing the relation between a power supply voltage and load impedance of the excitation circuit.
Figure 16:
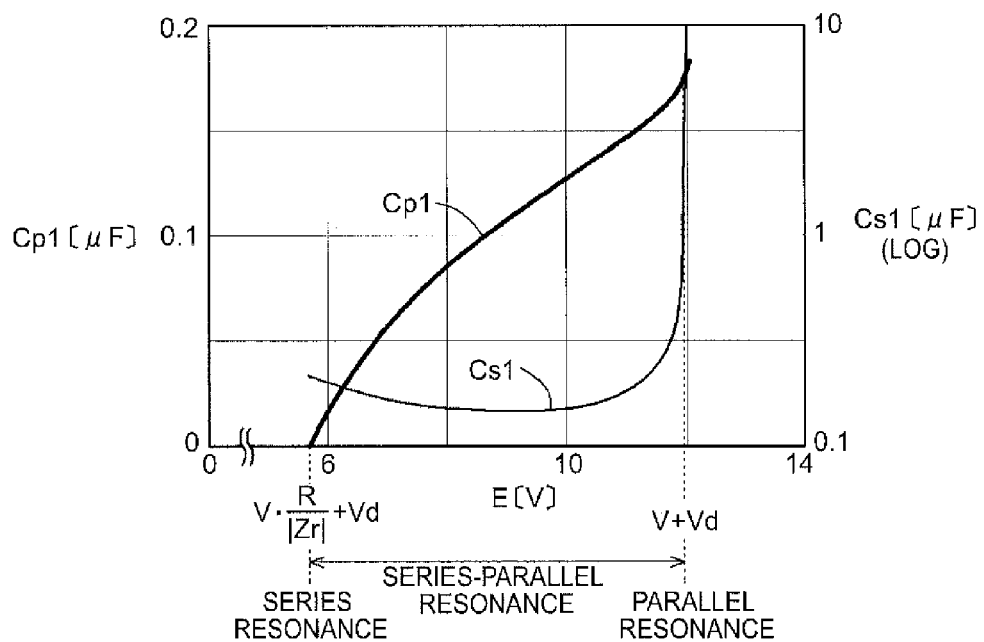
FIG. 16 is a graph showing the relation between the power supply voltage of the excitation circuit and circuit constants of the first circuit example.
Figure 17:
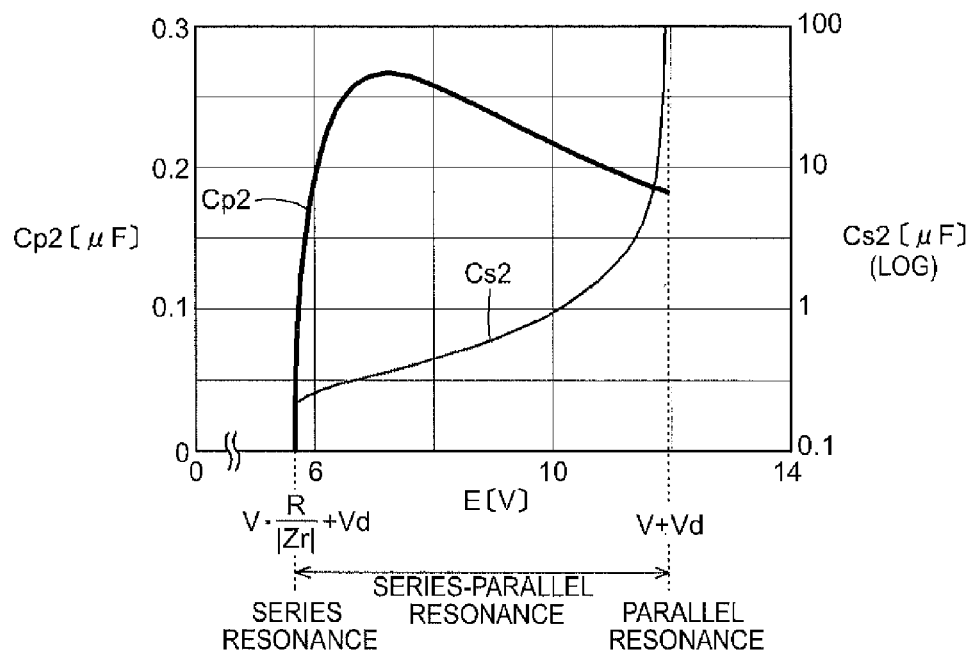
FIG. 17 is a graph showing the relation between the power supply voltage of the excitation circuit and circuit constants of the second circuit example.

FIGS. 15 to 17 show the relation between the power supply voltage E and the load impedance (Zps1, Zsp2) and the relation between the power supply voltage E and each resonant capacitor (Cp1, Cp2, Cs1, Cs2) in the first circuit example 11 and the second circuit example 12. An example is shown in which the DC resistance "R" of the excitation winding Lr is 30 [Ω], the inductance L thereof is 1200 [μH] (reactance "X": 75.4 [Ω]), and the excitation signal Vout having a peak value of 20 [Vp-p] is generated from the excitation source signal RDout having an excitation frequency f0 of 10 [kHz] and a peak value of 2 [Vp-p]. The impedance Zr of the excitation winding Lr is about 81.15 [Ω]. In FIGS. 15 to 17, the domain of the power supply voltage E is the range given by. Expression (4-3) shown again below.

$$\{V \cdot (R/|Zr|)\} + Vd < E < V + Vd \quad (4-3)$$

That is, the domain of the power supply voltage E is the range from the power supply voltage in the configuration having only the series resonance shown by the left side of Expression (4-3) to the power supply range in the configuration having only the parallel resonance shown by the right side of Expression (4-3). As used herein, the expression "having only the series resonance" corresponds to the case where the parallel resonant capacitor (Cp1, Cp1) is "0" in the first circuit example 11 and the second circuit example 12, and the expression "having only the parallel resonance" corresponds to the case where the series resonant capacitor (Cs1, Cs2) is "co" in the first circuit example 11 and the second circuit example 12.

FIG. 15 is a graph showing the relation between the power supply voltage E and the load impedance (Zps1, Zsp2). The characteristics of the load impedance (Zps1, Zsp2) for the power supply voltage E are common to both the first circuit example 11 and the second circuit example 12. As shown in FIG. 15, the load impedance (Zps1, Zsp2) is the largest in the configuration having only the parallel resonance, and is the smallest in the configuration having only the series resonance. As shown in FIG. 15, the most appropriate load impedance (Zps1, Zsp2) can be set according to the possible value of the power supply voltage E.

FIG. 16 is a graph showing the relation between the power supply voltage E and the resonant capacitors (Cp1, Cs1) in the first circuit example 11. The axis (right axis) for the series resonant capacitor Cs1 is a common logarithm axis. As shown in FIG. 16 and the above Expressions (6-1), (6-2), the most appropriate combination of the parallel resonant capacitor Cp1 and the series resonant capacitor Cs1 in the first circuit example 11 can be set according to the possible value of the power supply voltage E.

For example, if the value of the parallel resonant capacitor Cp1 is about 0.1083 [μF], the impedance Zr of the excitation winding Lr of about 81.15 [Ω] is converted to the load impedance Zp1 of about 153.65 [Ω]. A real axial component of this load impedance Zp1 is about 107.55 [Ω]. The load impedance Zp1 turns into the load impedance Zps1 (about 107.55 [Ω]) having only a real axial component by the series resonant capacitor Cs1 having capacitance of about 0.145 [μF]. In this case, the increase ratio of the amplitude by the series resonant capacitor Cs1 is about 1.43 (=153.65/107.55). Accordingly, the peak value of the excitation source signal Vin which is required to obtain the excitation signal Vout having a peak value of 20 [Vp-p], i.e., the peak value of the excitation source signal Vin that is output from the current amplifier circuit 53, is about 14 [Vp-p] (see FIG. 18A for a waveform example). In this case, a required power supply voltage is "±E=±9 [V]" as a drop-out voltage Vd (2 [V]) is added to "±7 [V]." The value of the impedance Z0 at the parallel resonant point is about 219.5 [Ω].

FIG. 17 is a graph showing the relation between the power supply voltage E and the resonant capacitors (Cp2, Cs2) in the second circuit example 12. As in FIG. 16, the axis (right axis) for the series resonant capacitor Cs2 is a common logarithm axis. As shown in FIG. 17 and the above Expressions (8-1), (8-2), the most appropriate combination of the parallel resonant capacitor Cp2 and the series resonant capacitor Cs2 in the second circuit example 12 can be set according to the possible value of the power supply voltage E.

For example, if the value of the series resonant capacitor Cs2 is about 0.5859 [μF], the impedance Zr of the excitation winding Lr of about 81.15 [Ω] is converted to the load impedance Zs2 of about 56.8 [Ω]. An imaginary axial component of this load impedance Zs2 is about 48.23 [Ω]. The load impedance Zs2 turns into the load impedance Zsp2 (about 107.55 [Ω]) having only a real axial component by the parallel resonant capacitor Cp2 having capacitance of about 0.2379 [μF]. In this case, the increase ratio of the amplitude by the series resonant capacitor Cs1 is about 1.43 (=81.15/56.8). Accordingly, the peak value of the excitation source signal Vin which is required to obtain the excitation signal Vout having a peak value of 20 [Vp-p] is about 14 [Vp-p] (see FIG. 18B for a waveform example). A required power supply voltage is "±E=±9 [V]" as described above.

In the excitation circuit 1 (11, 12) of the present invention, the power supply voltage range Epp is thus implemented by both positive and negative power supplies ±E, and the values of the resonant capacitors (Cp1, Cp2, Cs1, Cs2) can be satisfactorily set when the power supply voltage E is in the range given by Expression (4-3) shown again below.

$$\{V \cdot (R/|Zr|)\} + Vd < E < (V + Vd) \quad (4\text{-}3)$$

The excitation circuit 1 of the present invention is also applicable when the power supply voltage E is out of the range given by Expression (4-3), and such embodiments will be described below (FIG. 19, FIGS. 25 to 31).

Figure 18A:
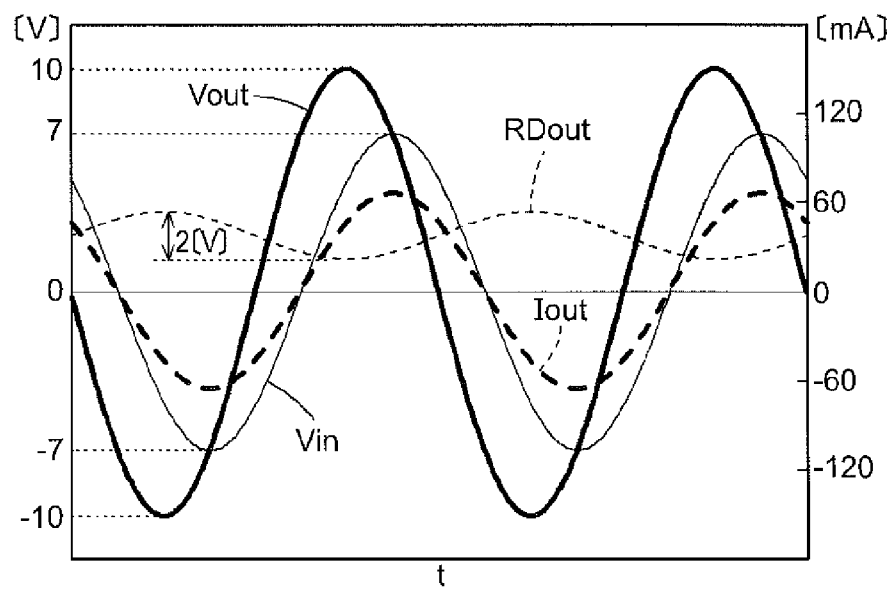
FIG. 18 shows waveform charts showing characteristics of the first circuit example (FIG. 18A) and characteristics of the second circuit example (FIG. 18B).
Figure 18B:
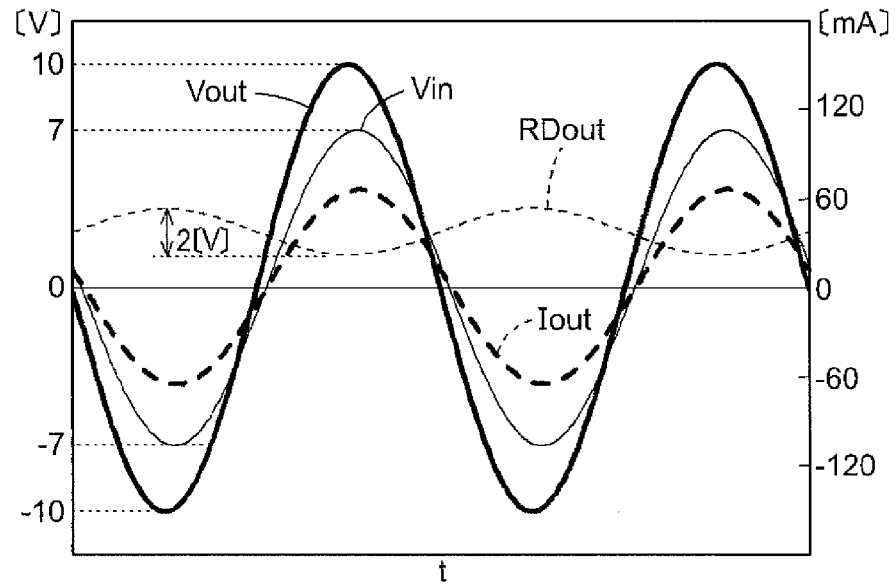

FIG. 18 shows simulation waveforms in the first circuit example 11 and the second circuit example 12. FIG. 18A shows waveforms of the first circuit example 11, and FIG. 18B shows waveforms of the second circuit example 12. In these simulation waveforms, the excitation source signal RDout is 2 [Vp-p], the excitation source signal Vin obtained through the current amplifier circuit 53 is 14 [Vp-p], and the excitation signal Vout is 20 [Vp-p]. As can be seen from FIG. 18, the excitation signal Vout having a predetermined amplitude (in this example, "10 [V]") can be obtained in both the first circuit example 11 and the second circuit example 12.

Examples using capacitors (capacitive elements) as the parallel resonant element $2p$ and the series resonant element $2s$ are shown in the first circuit example 11 and the second circuit example 12 described above. However, the parallel resonant element $2p$ and the series resonant element $2s$ need only have a reactance component, and are not limited to the form using a capacitor. For example, the excitation circuit 1 may be formed by using inductors (inductive elements) as the parallel resonant element $2p$ and the series resonant element $2s$.

Figure 19:
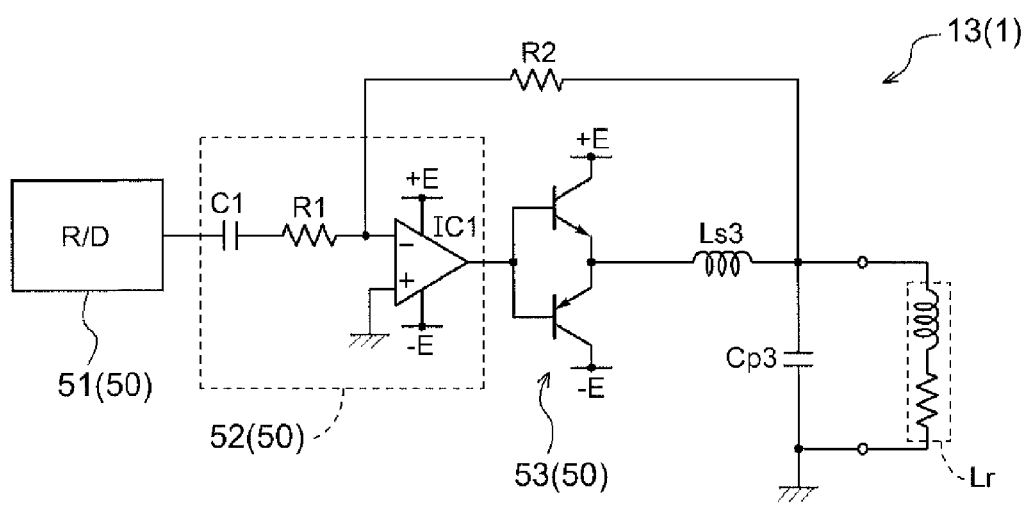
FIG. 19 is a schematic circuit diagram of a third circuit example of the excitation circuit.
Figure 20:
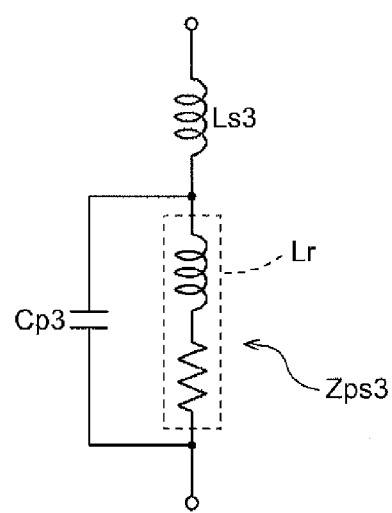
FIG. 20 is an equivalent circuit diagram of load impedance of the third circuit example.
Figure 21:
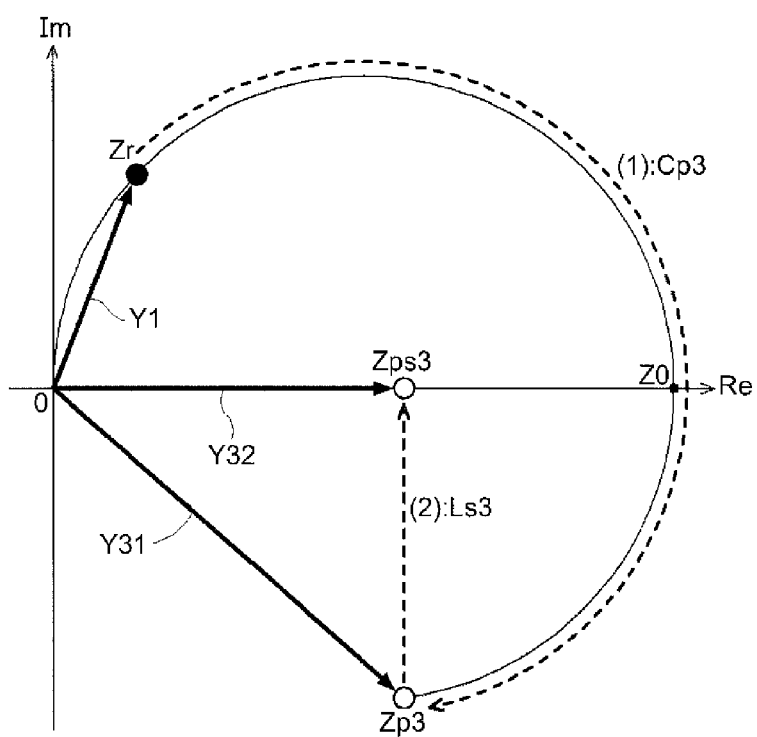
FIG. 21 is a vector diagram showing a method for adjusting the load impedance according to the third circuit example.

FIGS. 19 to 21 show a schematic circuit diagram of a third circuit example 13 of the excitation circuit 1 of the present invention (FIG. 19), an equivalent circuit of load impedance Zps3 thereof (FIG. 20), and a vector diagram on a complex plane (FIG. 21). As shown in FIG. 19, the third circuit example 13 has a series resonant inductor Ls3 as the series resonant element $2s$, and a parallel resonant capacitor Cp3 as the parallel resonant element $2p$. The third circuit example 13 has the series resonant inductor Ls3 instead of the series resonant capacitor Cs1 of the first circuit example 11 (FIG. 9) as the series resonant element $2s$. The direction of a vector locus for capacitors on a complex plane is opposite to that of a vector locus for inductors on a complex plane. In the first circuit example 11, the vector of the impedance is moved in the first quadrant of the complex plane in such a direction that the imaginary component becomes equal to "0" (FIG. 11). In the third circuit example 13, however, since the direction of the vector is opposite, the vector of the impedance is moved as shown in FIG. 21 in the fourth quadrant of the complex plane. The vector that is moved by the parallel resonant capacitor Cp3 does not stay in the first quadrant and moves beyond the parallel resonant point (Z0) into the fourth quadrant. The increase ratio of the amplitude in the third circuit example 13 is given by Expression (9) shown below, like Expression (5) for the first circuit example 11.

[Expression 9]

$$\frac{V}{E-Vd} = \frac{|Zp3|}{|Zps3|} \quad (9)$$

Figure 22:
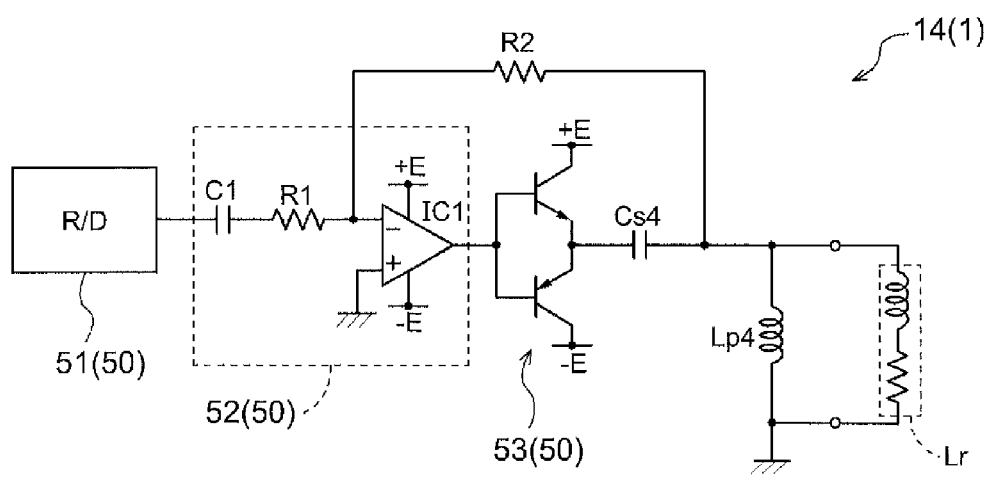
FIG. 22 is a schematic circuit diagram of a fourth circuit example of the excitation circuit.
Figure 23:
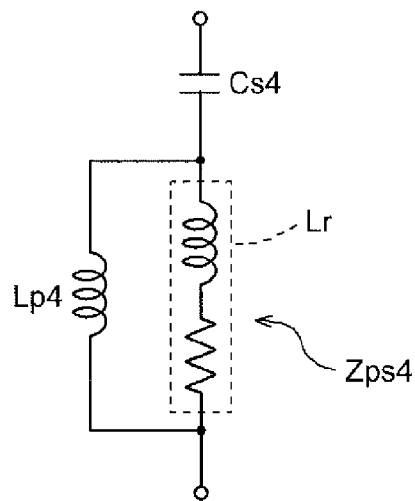
FIG. 23 is an equivalent circuit diagram of load impedance of the fourth circuit example.
Figure 24:
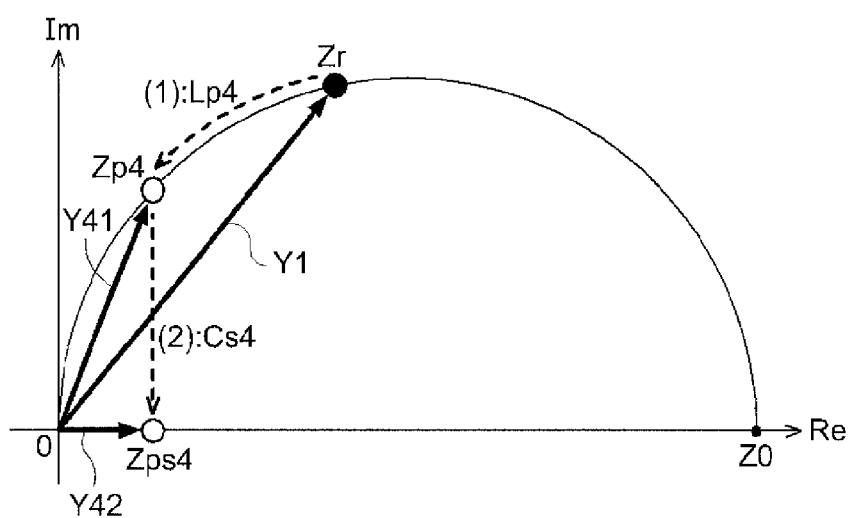
FIG. 24 is a vector diagram showing a method for adjusting the load impedance according to the fourth circuit example.

FIGS. 22 to 24 show a schematic circuit diagram of a fourth circuit example 14 of the excitation circuit 1 of the present invention (FIG. 22), an equivalent circuit of load impedance Zps4 thereof (FIG. 23), and a vector diagram on a complex plane (FIG. 24). As shown in FIG. 22, the fourth circuit example 14 has a parallel resonant inductor Ls4 as the parallel resonant element $2p$, and a series resonant capacitor Cp4 as the series resonant element $2s$. The fourth circuit example 14 has the parallel resonant inductor Lp4 instead of the parallel resonant capacitor Cp1 of the first circuit example 11 (FIG. 9) as the parallel resonant element $2p$. As described above, the direction of a vector locus for capacitors on a complex plane is opposite to that of a vector locus for inductors on a complex plane. The vector, which is moved clockwise along the circumference as shown in FIG. 11 in the first circuit example 11, is moved counterclockwise in the fourth circuit example 14 (FIG. 24). The increase ratio of the amplitude is similar to Expression (5) for the first circuit example 11 and Expression (9) for the third circuit example 13, and is given by Expression (10) shown below.

[Expression 10]

$$\frac{V}{E-Vd} = \frac{|Zp4|}{|Zps4|} \quad (10)$$

Each of the above circuit examples (11 to 14) is the excitation circuit 1 that is suitable when the range of the power supply voltage E is given by Expression (4-3) shown again below.

$$\{V \cdot (R/|Zr|)\} + Vd < E < V + Vd \quad (4\text{-}3)$$

The third circuit example 13 described above is also applicable when the power supply voltage E is out of this range, e.g., when the power supply voltage E is smaller than the left side of Expression (4-3), as given by, e.g., the following Expression (4-4).

$$E < \{V \cdot (R/|Zr|)\} + Vd \quad (4\text{-}4)$$

Figure 25:
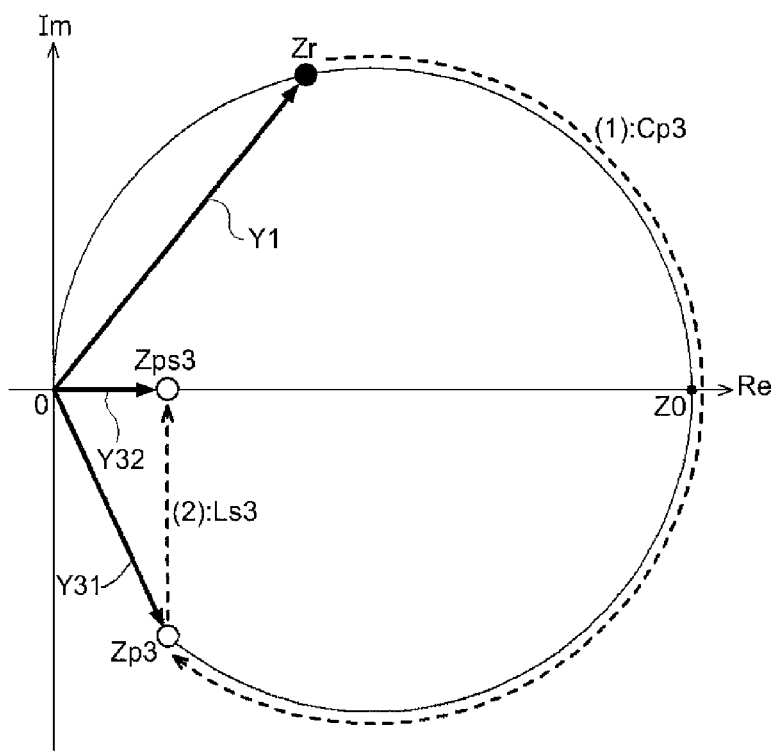
FIG. 25 is a vector diagram showing another method for adjusting the load impedance according to the third circuit example.

In this case, the difference between this power supply voltage E and the power supply voltage E in the range given by Expression (4-3) can be compensated for by the increase ratio. For example, the increase ratio can be increased in the third circuit example 13 described above. Specifically, the increase ratio can be increased by reducing the value of "|Zp3|" in the above Expression (9). This can be implemented by increasing the range in which the vector of the impedance is moved by the parallel resonant capacitor Cp3 to a range larger than the moving range shown by the vector locus of FIG. 21, as shown in FIG. 25.

On the other hand, in the case where the power supply voltage E is out of the range given by Expression (4-3) on the different side (right side) from Expression (2-4), the power supply voltage E can be, e.g., larger than the right side of Expression (4-3) as given by the following Expression (4-5).

$$E > V + Vd \tag{4-5}$$

In this case, the difference between this power supply voltage E and the power supply voltage E in the range given by Expression (4-3) can be adjusted by the increase ratio. That is, the amplitude can be reduced by setting the increase ratio to a value less than "1" (this can be referred to as setting the "reduction ratio"). For example, as described later, the increase ratio can be set to a value less than "1" by a fifth circuit example 15 (FIG. 26) as a modification of the second circuit example 12. That is, the amplitude of the excitation signal Vout can be reduced with respect to the excitation source signal Vin having passed through the current amplifier circuit 53, by using the circuit configuration of the fifth circuit example 15.

Figure 26:
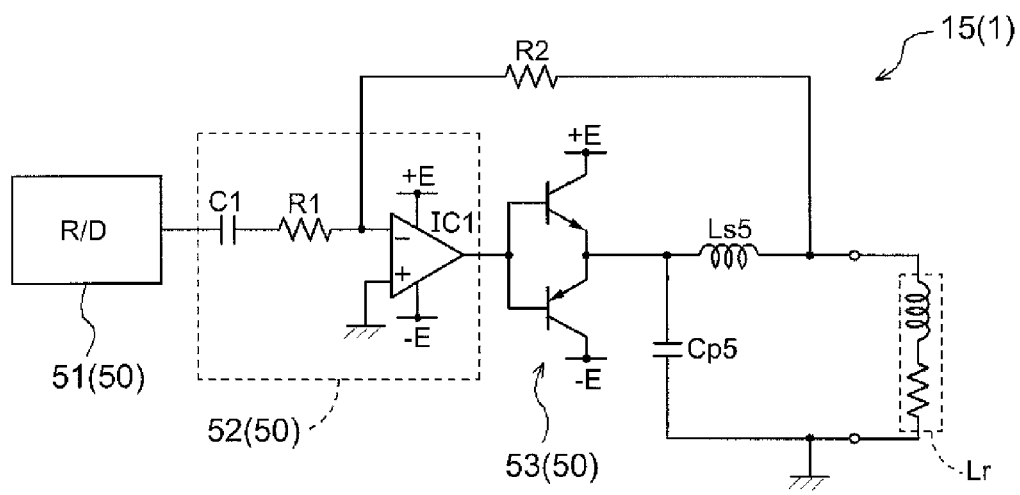
FIG. 26 is a schematic circuit diagram of a fifth circuit example of the excitation circuit.
Figure 27:
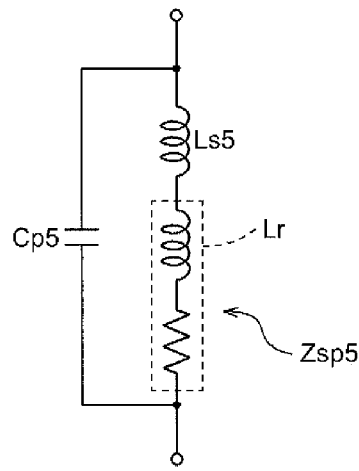
FIG. 27 is an equivalent circuit diagram of load impedance of the fifth circuit example.
Figure 28:
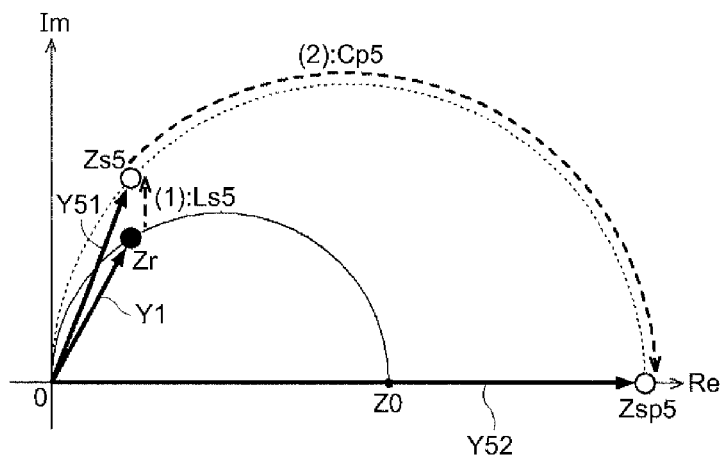
FIG. 28 is a vector diagram showing a method for adjusting the load impedance according to the fifth circuit example.

FIGS. 26 to 28 show a schematic circuit diagram of the fifth circuit example 15 of the excitation circuit 1 of the present invention (FIG. 26), an equivalent circuit of load impedance Zsp5 thereof (FIG. 27), and a vector diagram on a complex plane (FIG. 28). As shown in FIG. 26, the fifth circuit example 15 has a series resonant inductor Ls5 as the series resonant element 2s, and a parallel resonant capacitor Cp5 as the parallel resonant element 2p. The fifth circuit example 15 has the series resonant inductor Ls5 instead of the series resonant capacitor Cs2 of the second circuit example 12 (FIG. 12) as the series resonant element 2s. As described above, the direction of a vector locus for capacitors on a complex plane is opposite to that of a vector locus for inductors on a complex plane. In the second circuit example 12, the vector of the impedance is moved by the series resonant element 2s (series resonant capacitor Cs2) in such a direction that the imaginary component becomes equal to "0," as shown in FIG. 14. However, in the fifth circuit example 15 using the series resonant inductor Ls5 as the series resonant element 2s, the vector Y1 is moved to a vector Y51 by the series resonant element 2s (series resonant inductor Ls5) in such a direction that the imaginary component (reactance component) increases, as shown in FIG. 28. The vector Y51 is further moved to a parallel resonant point (Zsp5) of impedance Zs5 shown by the vector by Y51, namely to a vector Y52, by the parallel resonant capacitor Cp5.

As shown in FIG. 28, in this case, the locus of the vector of the impedance is located on a circumference that is disposed outside a circle passing through the impedance Zr of the excitation winding Lr, the parallel resonant point (Z0) for the impedance Zr, and the origin of the complex plane. Specifically, this outer circumference is a circle having its center on the real axis Re and passing through the origin of the complex plane and the impedance Zs5 shown by the vector Y51. The increase ratio (the reduction ratio in the fifth circuit example 15 is given by the following Expression (11), like Expression (7) showing the increase ratio in the second circuit example 12 described above.

[Expression 11]

$$\frac{V}{E - Vd} = \frac{|Zr|}{|Zs5|} \tag{11}$$

Similarly, in the case where the power supply voltage E is larger than the range given by Expression (4-3), as shown by Expression (4-5) shown again below, a circuit configuration different from the fifth circuit example 15 (FIG. 26) described above may be used.

$$E > V + Vd \tag{4-5}$$

Figure 29:
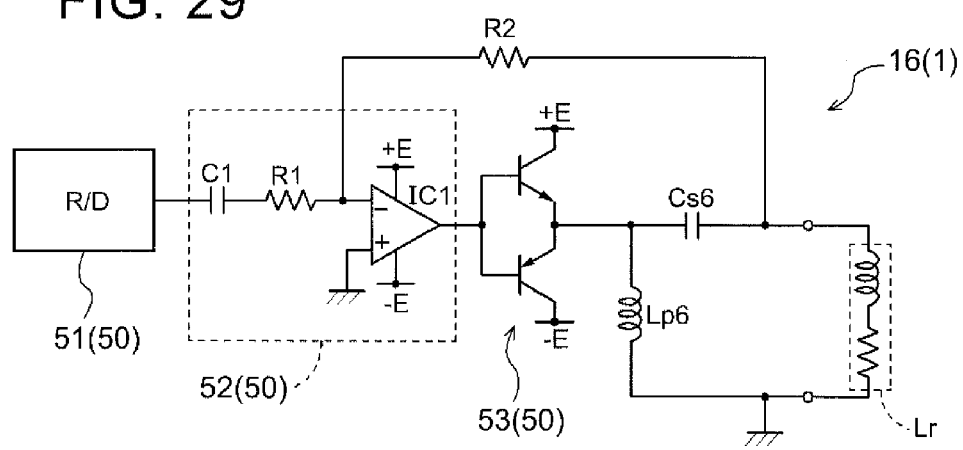
FIG. 29 is a schematic circuit diagram of a sixth circuit example of the excitation circuit.
Figure 30:
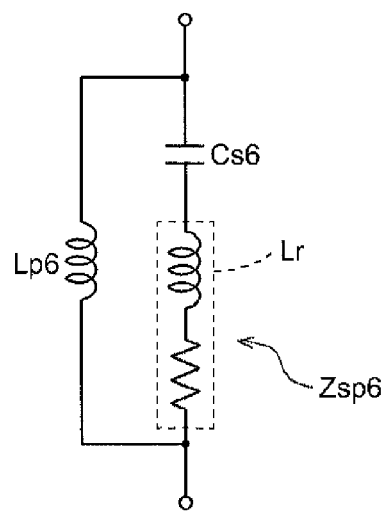
FIG. 30 is an equivalent circuit diagram of load impedance of the sixth circuit example.
Figure 31:
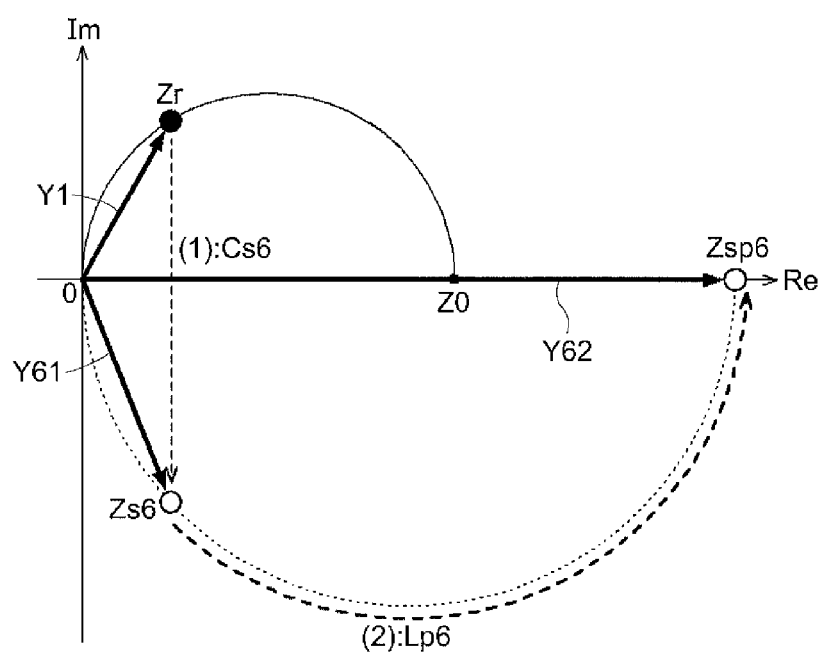
FIG. 31 is a vector diagram showing a method for adjusting the load impedance according to the sixth circuit example.

That is, like the fifth circuit example 15 (FIG. 26) as a modification of the second circuit example 12, the increase ratio can be set to a value less than "1" by a sixth circuit example 16 (FIG. 29) as a modification of the second circuit example 12. FIGS. 29 to 31 show a schematic circuit diagram of the sixth circuit example 16 of the excitation circuit 1 of the present invention (FIG. 29), an equivalent circuit of load impedance Zsp6 thereof (FIG. 30), and a vector diagram on a complex plane (FIG. 31). The fifth circuit example 15 has the series resonant inductor Ls5 instead of the series resonant capacitor Cs2 of the second circuit example 12 (FIG. 12). However, as shown in FIG. 29, the sixth circuit example 16 has a parallel resonant inductor Lp6 instead of the parallel resonant capacitor Cp2 of the second circuit example 12 (FIG. 12).

In the second circuit example 12, as shown in FIG. 14, the vector does not reach the real axis Re by the operation of the series resonant capacitor Cs2. That is, in the second circuit example 12, the vector of the impedance is moved within the first quadrant of the complex plane by the series resonant capacitor Cs2, as shown in FIG. 14. On the other hand, in the sixth circuit example 16, as shown in FIG. 31, the vector is moved beyond the real axis Re into the fourth quadrant of the complex plane by the operation of the series resonant capacitor Cs2. As described above, the direction of a vector locus for capacitors on a complex plane is opposite to that of a vector locus for inductors on a complex plane. In the second circuit example 12, as shown in FIG. 14, the vector Y21 to which the vector has been moved by the operation of the series resonant capacitor Cs2 is moved clockwise along the circumference to the parallel resonant point (Zsp2) of the vector Y21 by the operation of the parallel resonant capacitor Cp2. On the other hand, in the sixth circuit example 16, as shown in FIG. 31, a vector Y61 to which the vector has been moved by the operation of a series resonant inductor Ls6 is moved counterclockwise along a circumference to a parallel resonant point (Zsp6) of the vector Y61 by the operation of the parallel resonant capacitor Cp6.

As shown in FIG. 31, in this case, the locus of the vector of the impedance is located on a circumference that is disposed outside a circle passing through the impedance Zr of the excitation winding Lr, the parallel resonant point (Z0) for the impedance Zr, and the origin of the complex plane. Specifically, this outer circumference is a circle having its center on the real axis Re and passing through the origin of the complex plane and impedance Zs6 shown by the vector Y61 of the impedance. In each of the two circles, the range in which the vector locus is plotted is along the circumference of a semicircle. The ranges are thus along the respective circumferences of the semicircles which are drawn in different quadrants (the first and fourth quadrants) of the complex plane (FIG. 31). The increase ratio (the reduction ratio) in the sixth circuit example 16 is given by the following Expression (12), like Expressions (7) and (11)

showing the increase ratio in the second circuit example 12 and the fifth circuit example 15 described above.

[Expression 12]

$$\frac{V}{E - Vd} = \frac{|Zr|}{|Zs6|} \quad (12)$$

Figure 32:
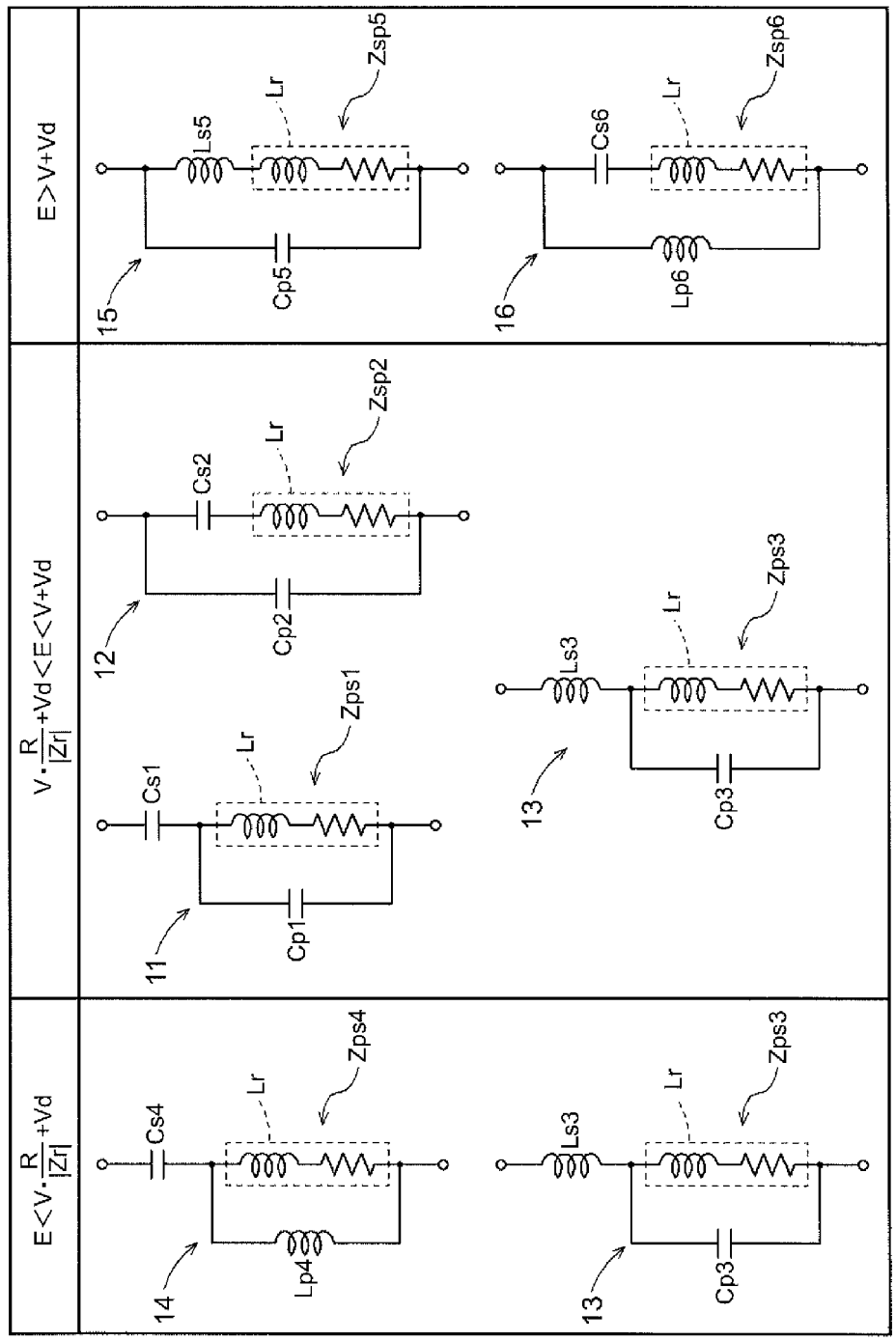
FIG. 32 is a table showing correspondence between the power supply voltage of the excitation circuit and each circuit example.

As described above by using the various circuit examples (11 to 16), the excitation circuit 1 of the present invention can set the parallel resonant element 2p and the series resonant element 2s so as to be flexibly applied to a wide range of the power supply voltage E. The table of FIG. 32 shows preferred combinations of the excitation circuit 1 (11 to 16) for the power supply voltage E. The excitation circuit 1 that is formed only by the parallel resonant circuit ("E" is equal to the right side of Expression (4-3)) and the excitation circuit 1 that is formed only by the series resonant circuit ("E" is equal to the left side of Expression (4-3)) are omitted in FIG. 32. As can be seen from FIG. 32, the excitation circuit 1 of the present invention forms an excellent resolver excitation apparatus whose optimal circuit configuration can be selected according to the power supply voltage E etc. As shown by Expressions (5) to (8-2) as representative examples, the circuit constants of the parallel resonant element 2p and the series resonant element 2s can be set as appropriate according to the power supply voltage E etc. Accordingly, the present invention can be applied to various resolvers 40 by mounting parts having different circuit constants on circuit boards having the same circuit pattern.

Figure 36:
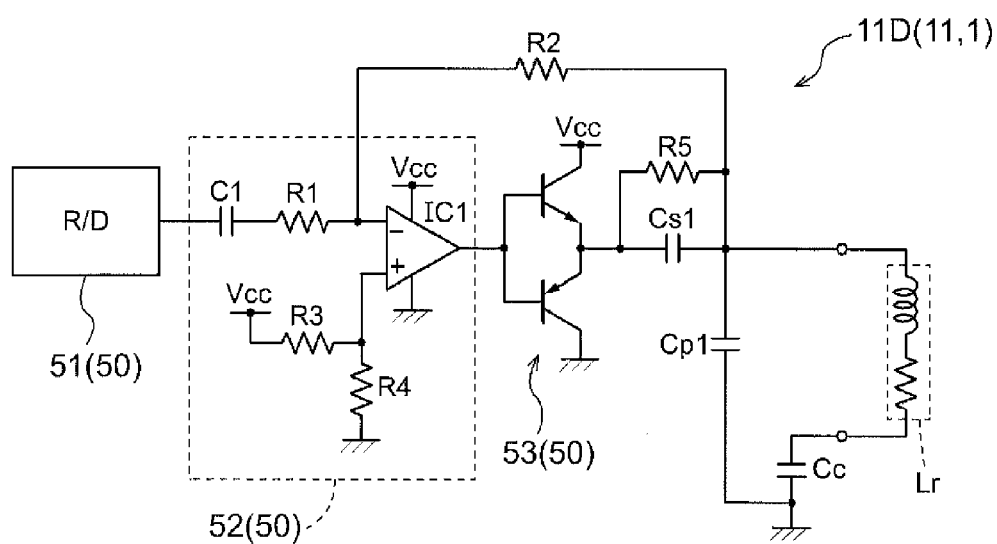
FIG. 36 is a schematic circuit diagram of a practical excitation circuit of the first example circuit which uses a single power supply.
Figure 37:
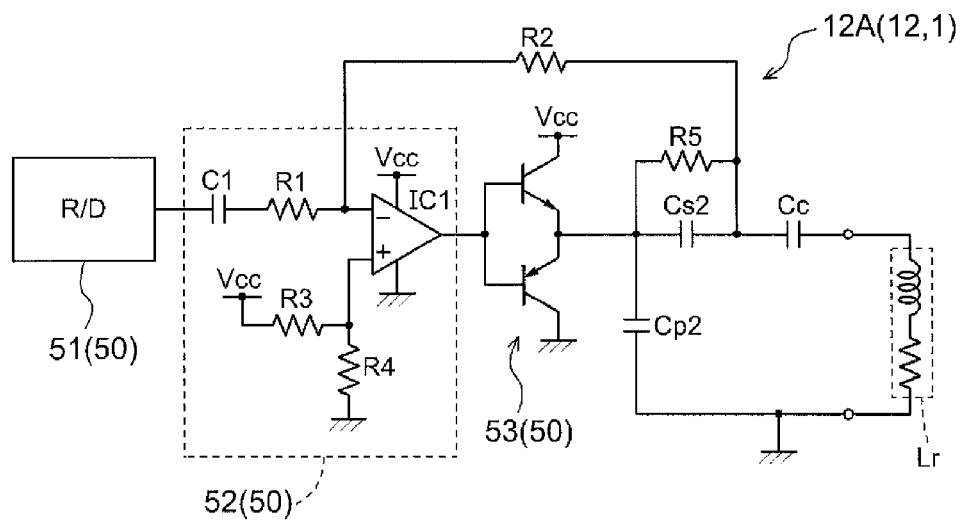
FIG. 37 is a schematic circuit diagram of a practical excitation circuit of the second example circuit which uses a single power supply.
Figure 38:
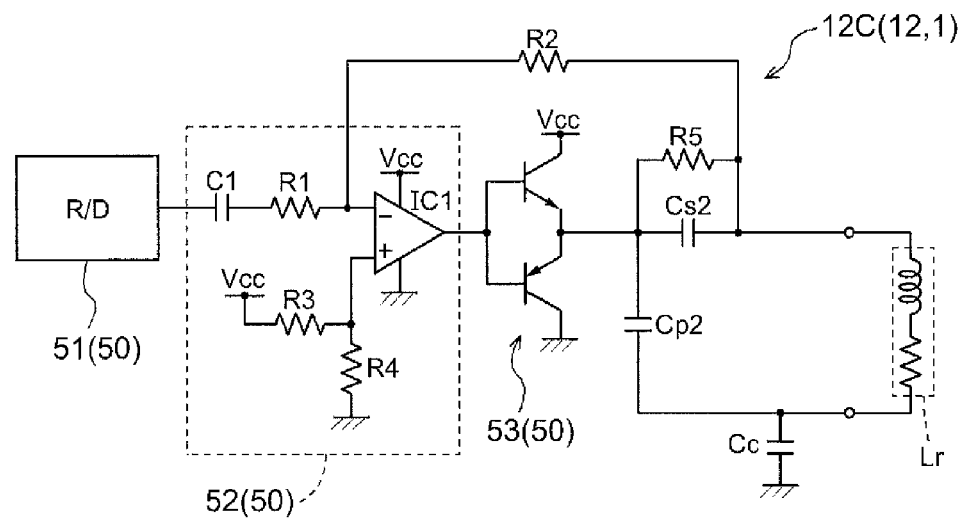
FIG. 38 is a schematic circuit diagram of a practical excitation circuit of the second example circuit which uses a single power supply.
Figure 39:
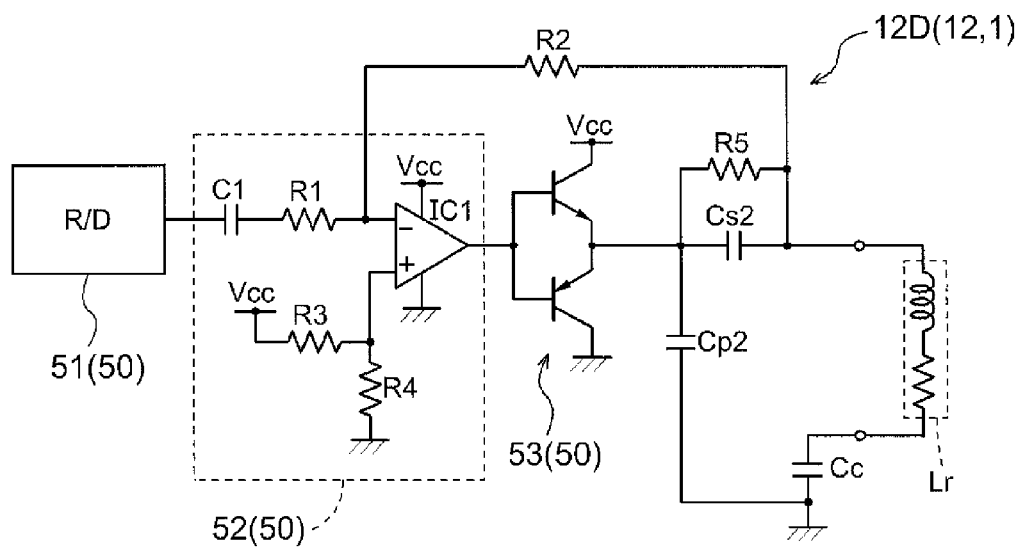
FIG. 39 is a schematic circuit diagram of a practical excitation circuit of the second example circuit which uses a single power supply.

In order to focus on the characteristics of the invention, the present invention is described above by using the simplified circuit examples (11 to 16) having both positive and negative power supplies (±E). More practically, however, it is preferable to form the excitation circuit 1 by using a single power supply having a power supply voltage range Epp between the ground and the positive power supply. FIGS. 33 to 39 show schematic circuit diagrams of the practical excitation circuits 1 with a single power supply (from the positive power supply Vcc to the ground), which correspond to the first circuit example 11 and the second circuit example 12. FIGS. 33 to 36 show variations (11A, 11B, 11C, 11D) of the excitation circuit 1 of the first circuit example 11. FIGS. 37 to 39 show variations (12A, 12C, 12D) of the excitation circuit 1 of the second circuit example 12.

Since the power supply of each excitation circuit 1 shown in FIGS. 33 to 39 is a single power supply, the DC component need be removed when the excitation signal Vout is applied to the excitation winding Lr. Each excitation circuit 1 shown in FIGS. 33 to 39 therefore includes a coupling capacitor Cc. A resistor R5 is connected in parallel with the series resonant capacitor (Cs1, Cs2) in order a suitable time constant is set for charging the coupling capacitor Cc when the power is turned on, and a shift of the DC operating point which is caused by a leakage current of the coupling capacitor Cc is suppressed. The circuit constant of the coupling capacitor Cc is set according to the frequency of the excitation source signal RDout or the excitation signal Vout (f0=ω0/2π=10 to 20 [kHz]), and is, e.g., about 100 [μF]. On the other hand, the circuit constants of the parallel resonant capacitor Cp and the series resonant capacitor Cs are about 0.1 to 1 [μF] in the case where the first circuit example 11 is applied to a resolver having "R=about 30 [Ω]" and "L=about 1,200 [μH]." The parallel resonant capacitor Cp and the series resonant capacitor Cs thus have different frequency characteristics, and do not significantly affect each other.

Since the power supply of each excitation circuit 1 shown in FIGS. 33 to 39 is a single power supply, the reference voltage (DC operating point) of the operational amplifier IC1 need be set to a value between the positive power supply Vcc and the ground in order that the excitation source signal RDout as an AC signal is input to the operational amplifier IC1. This reference voltage is preferably set to an intermediate potential (e.g., "Vcc/2") between the positive power supply Vcc and the ground. Resistors having the same resistance value are therefore used as resistors R3, R4 that are voltage dividing resistors.

Figure 33:
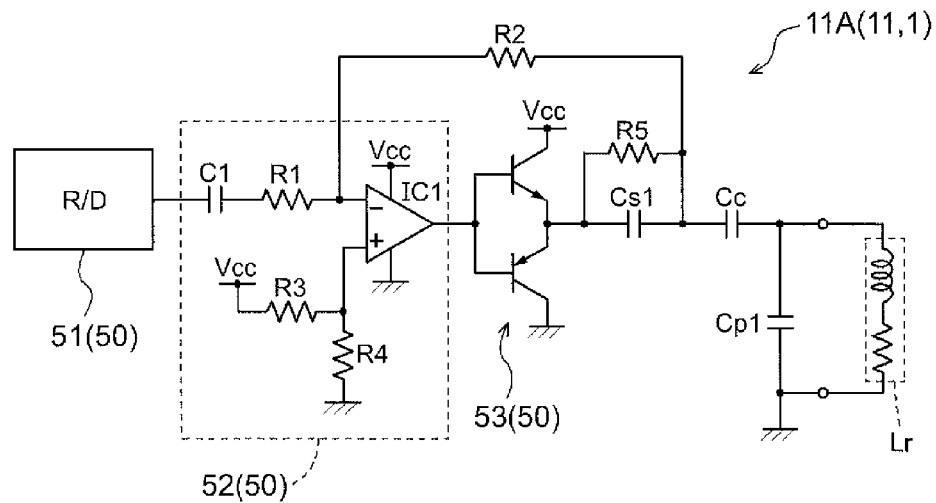
FIG. 33 is a schematic circuit diagram of a practical excitation circuit of the first example circuit which uses a single power supply.
Figure 34:
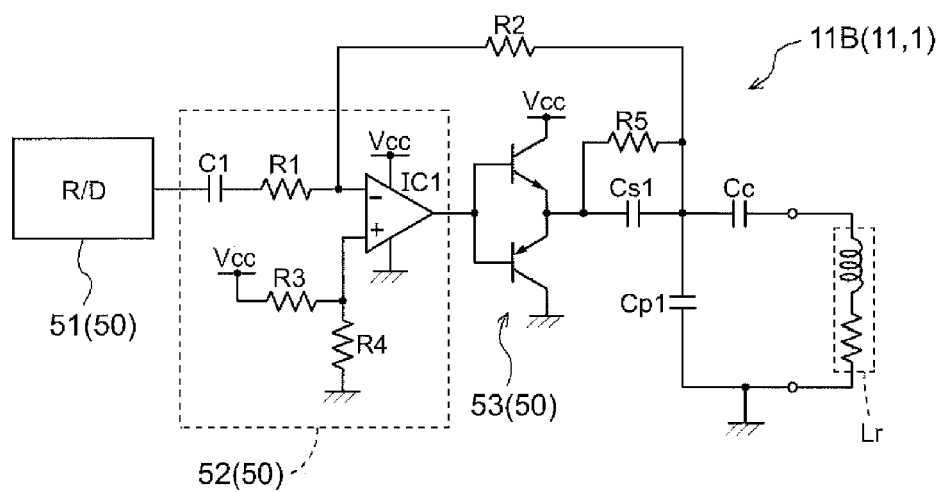
FIG. 34 is a schematic circuit diagram of a practical excitation circuit of the first example circuit which uses a single power supply.
Figure 35:
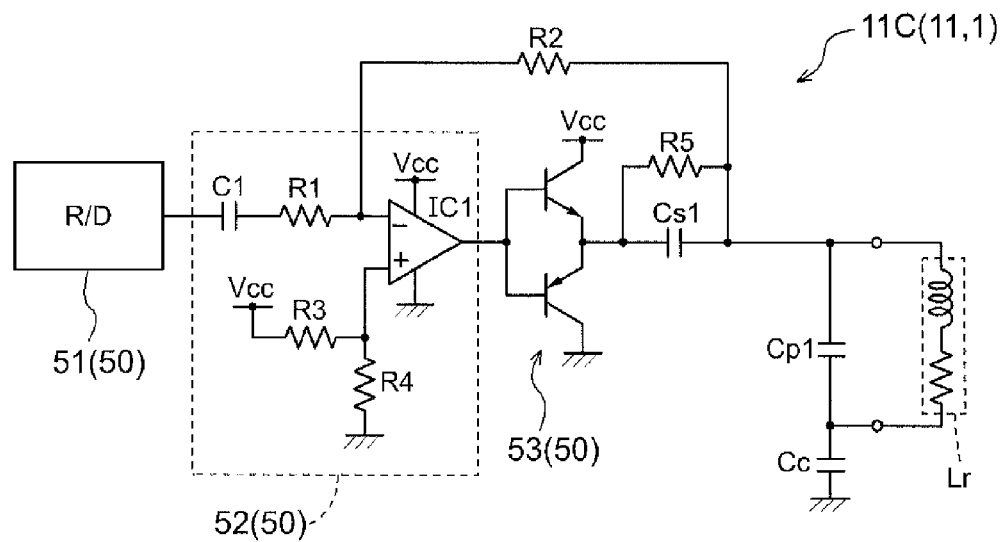
FIG. 35 is a schematic circuit diagram of a practical excitation circuit of the first example circuit which uses a single power supply.

The excitation circuit 11A of FIG. 33 has the most common circuit configuration of the first circuit example 11 whose principle is shown in FIG. 9. The excitation circuit 11A and the excitation circuit 11B of FIG. 34 are different from each other only in the placement of the coupling capacitor Cc, and are otherwise similar to each other. Unlike the excitation circuit 11A and the excitation circuit 11B, the coupling capacitor Cc is placed between the excitation winding Lr and the ground in the excitation circuit 11C of FIG. 35 and the excitation circuit 11D of FIG. 36. The excitation winding Lr has a small resistance component. Accordingly, if the excitation winding Lr is short-circuited to the positive power supply Vcc (short-circuited to the power supply) in the excitation circuit 11A and the excitation circuit 11B, the positive power supply Vcc can be substantially short-circuited to the ground, which can cause a large current to flow. In the excitation circuit 11C and the excitation circuit 11D, however, the coupling capacitor Cc is present between the ground and the excitation winding Lr. Accordingly, flow of a large current due to a short-circuit between the positive power supply Vcc and the ground is suppressed even if the excitation winding Lr is short-circuited to the positive power supply. The excitation circuit 11C of FIG. 35 and the excitation circuit 11D of FIG. 36 are different from each other only in the placement of the coupling capacitor Cc, and are otherwise similar to each other.

The excitation circuit 12A of FIG. 37 has the most common circuit configuration of the second circuit example 12 whose principle is shown in FIG. 12. Unlike the excitation circuit 12A, the coupling capacitor. Cc is placed between the excitation winding Lr and the ground in the excitation circuit 12C of FIG. 39 and the excitation circuit 12D of FIG. 39. That is, like the excitation circuit 11C (FIG. 35) and the excitation circuit 11D (FIG. 36) described above, each of the excitation circuits 12C, 12D is an example of the circuit configuration that facilitates protection against a short-circuit to the power supply source. The excitation circuit 12C of FIG. 38 and the excitation circuit 12D of FIG. 39 are different from each other only in the placement of the coupling capacitor Cc, and are otherwise similar to each other.

Figure 40:
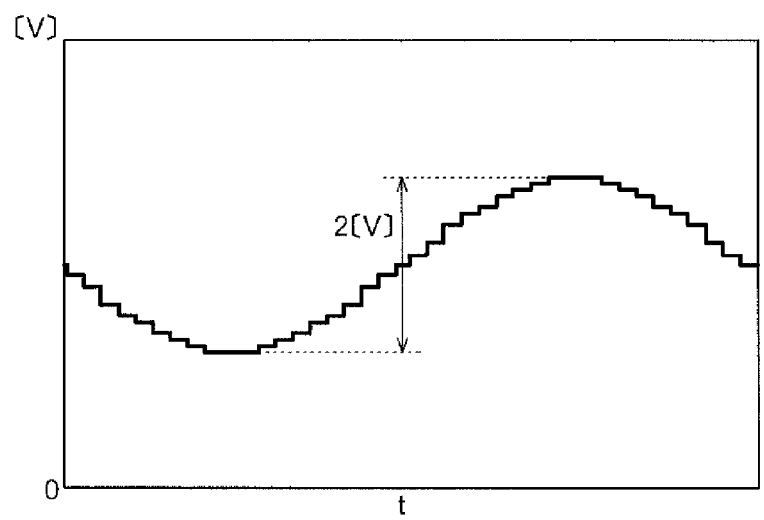
FIG. 40 is a waveform chart showing a stair-like waveform example of an excitation source signal.

As described above with reference to FIG. 2, the R/D converter 51 generates the excitation source signal RDout that excites the excitation winding Lr. The excitation source signal RDout is, e.g., a sinusoidal signal having a peak value of 2 [V] and a frequency of 10 [kHz] to 20 [kHz] (see, e.g., FIG. 18). In order to form the excitation source signal generating section 57 with a simple configuration, the excitation source signal RDout is generated by, e.g., outputting a discrete voltage value while the value is varied in a time series manner. That is, the excitation source signal RDout is generated by a method like digital-to-analog conversion (D-to-A conversion) in which digital signals are connected in a time series manner into an analog signal. Accordingly, the excitation source signal RDout that is output from the R/D converter 51 sometimes has a stair-like waveform as shown in FIG. 40. In such a signal having a stair-like waveform, a signal having a frequency component (high frequency component) much higher than a fundamental component has been superimposed. Detection accuracy of the position of a magnetic pole may be decreased if this high frequency component remains in the excitation signal Vout. Moreover, the high frequency component may increase high frequency radiation noise (emission noise).

It is therefore desirable that such a high frequency component be reduced by the time the excitation source signal RDout is output as the excitation signal Vout. For example, adding a low-pass filter to the excitation circuit 1 can make the stair-like waveform smoother and can attenuate the high frequency component. An embodiment in which a low-pass filter is added to the excitation circuit 11A having the circuit configuration shown in FIG. 33 will be described below as an example of a practical circuit form. The excitation circuit 11A shown in FIG. 33 has an excitation source signal input line to which the excitation source signal RDout is applied, and a feedback loop that feeds the excitation signal Vout back to the excitation source signal input line, and further has a feedback controller (operational amplifier IC1) that performs feedback control to stabilize the amplitude of the excitation signal Vout. In an example shown in FIG. 41 as one form, an excitation circuit 11E having a low-pass filter is formed by adding to the excitation circuit 11A a capacitor Cf functioning as a low-pass filter in the feedback loop of the operational amplifier IC1. The capacitor Cf is connected in parallel with the feedback resistance R2 that sets the gain of signal amplification by the operational amplifier IC1. The gain of signal amplification is determined by the ratio (R2/R1) of feedback resistance R2 to input resistance (resistor R1) of the operational amplifier IC1. For example, in the case of "R1=1 [kΩ]" and "R2=10 [kΩ]" the gain is 10.

Figure 41:
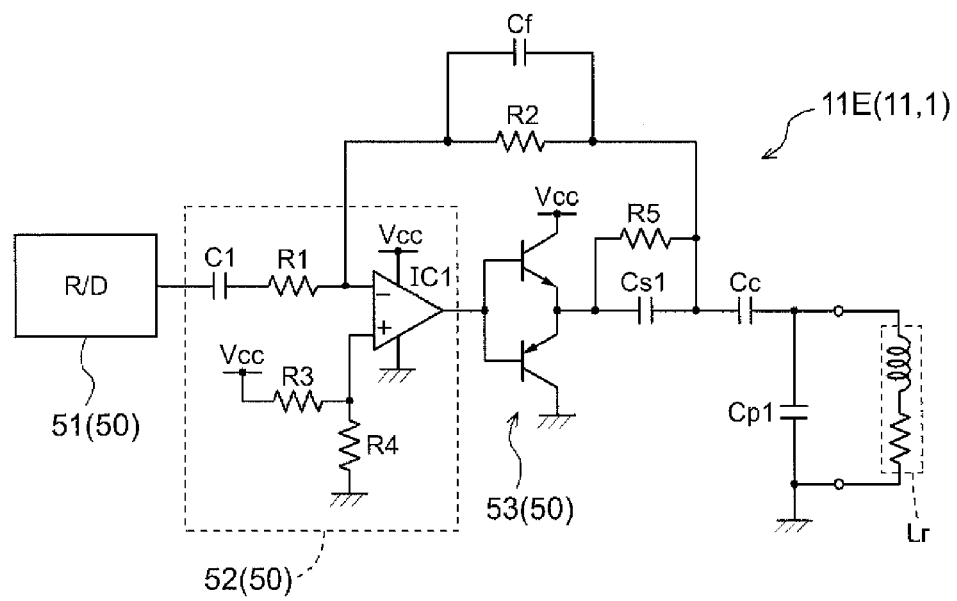
FIG. 41 is a schematic circuit diagram of the excitation circuit of FIG. 33 having a filter incorporated therein.
Figure 42:
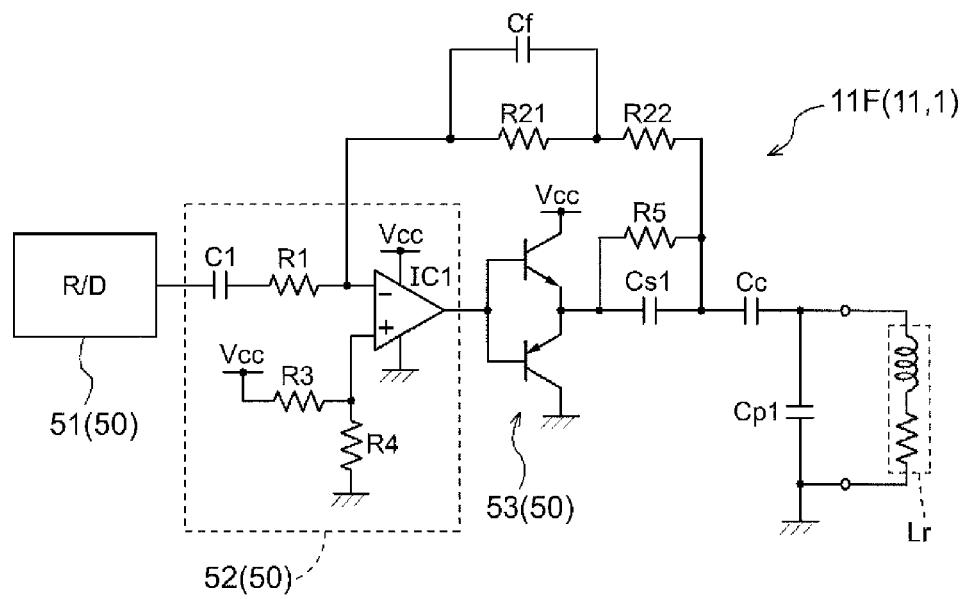
FIG. 42 is a schematic circuit diagram of the excitation circuit of FIG. 33 having a filter incorporated therein.

The form in which the capacitor Cf is added to the feedback loop of the operational amplifier IC1 is not limited to the excitation circuit 11E shown in FIG. 41, and may be implemented as, e.g., the form of an excitation circuit 11F shown in FIG. 42. In the excitation circuit 11F of FIG. 42, the feedback resistance R2 is divided into two, namely a first feedback resistance R21 and a second feedback resistance R22, and the capacitor Cf is connected in parallel with the first feedback resistance R21 as one of the two feedback resistances. The feedback resistance R2 is divided so that the sum of the first feedback resistance R21 and the second feedback resistance R22 has the same value as the feedback resistance R2. For example, in the case of "R2=10 [kΩ]," the feedback resistance R2 can be divided so that "R21=R22=5 [kΩ]." The gain of the operational amplifier IC1 is "(R21+R22)/R1," and the gain of the operational amplifier IC1 is the same between the excitation circuit 11E and the excitation circuit 11F.

Figure 43:
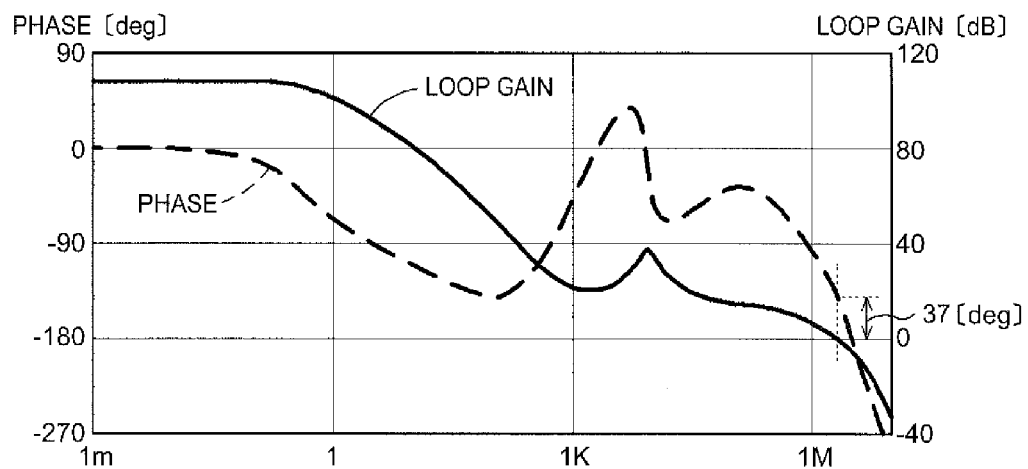
FIG. 43 is a Bode plot of a loop transfer function of the excitation circuit of FIG. 41.
Figure 44:
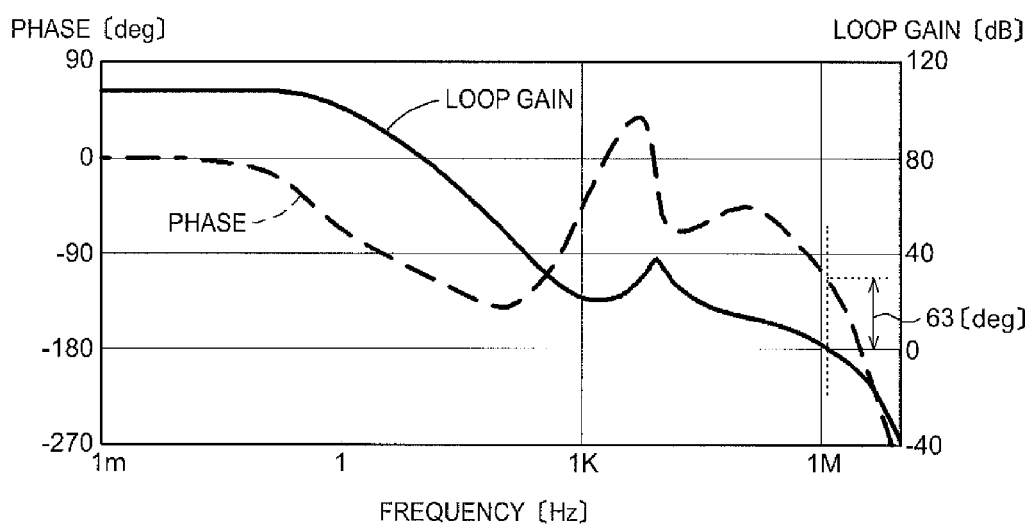
FIG. 44 is a Bode plot of a loop transfer function of the excitation circuit of FIG. 42.

In such a circuit having a feedback controller as the excitation circuit 11, it is desirable that a sufficient phase margin of a loop transfer function including the feedback loop be ensured so that the circuit is stabilized. It is commonly said that the circuit is stable if the phase margin of the loop transfer function is 60 degrees or more. As shown in FIGS. 43 and 44, the "phase margin" is the difference between the phase at the zero crossing point (the frequency at which a loop gain is "0 [dB]") in the Bode plot of the loop transfer function and −180 degrees in the Bode plot. FIG. 43 is a Bode plot of the loop transfer function of the excitation circuit 11E of FIG. 41, and FIG. 44 is a Bode plot of the loop transfer function of the excitation circuit 11F of FIG. 42. The abscissa in FIGS. 43 and 44 is a logarithm axis. The phase margin in the excitation circuit 11E of FIG. 41 is about 37 degrees, and the phase margin in the excitation circuit 11F of FIG. 42 is about 63 degrees. That is, the excitation circuit 11F of FIG. 42 is more stable than the excitation circuit 11E of FIG. 41. If the circuit is not stable, its output (in this case, the excitation signal Vout) may oscillate. In view of the phase margin, it is therefore more preferable to use the configuration of the excitation circuit 11F of FIG. 42 than to use the configuration of the excitation circuit 11E of FIG. 41.

In the excitation circuit 11F of FIG. 42, the phase margin of 60 degrees or more can be ensured, but the function of the low-pass filter in the feedback loop is suppressed. Accordingly, the high frequency component forming the stair-like waveform may not be sufficiently removed depending on the voltage resolution of the excitation source signal RDout that is output from the R/D converter 51. That is, the higher the voltage resolution of the excitation source signal RDout is, the lower the height of each step of the stair-like waveform is, and the smaller the amplitude of the high frequency component is. Thus, the higher the voltage resolution of the excitation source signal RDout is, the more easily the high frequency component can be removed. On the other hand, the lower the voltage resolution of the excitation source signal RDout is, the greater the height of each step of the stair-like waveform is, and the larger the amplitude of the high frequency component is. Thus, the lower the voltage resolution of the excitation source signal RDout is, the higher the removal capability required for the low-pass filter is.

Figure 45:
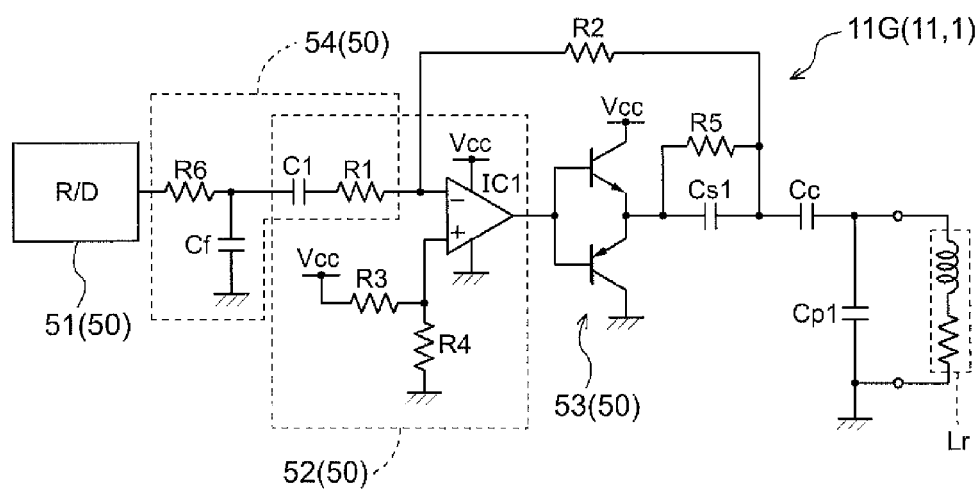
FIG. 45 is a schematic circuit diagram of the excitation circuit of FIG. 33 having a filter incorporated therein.
Figure 46:
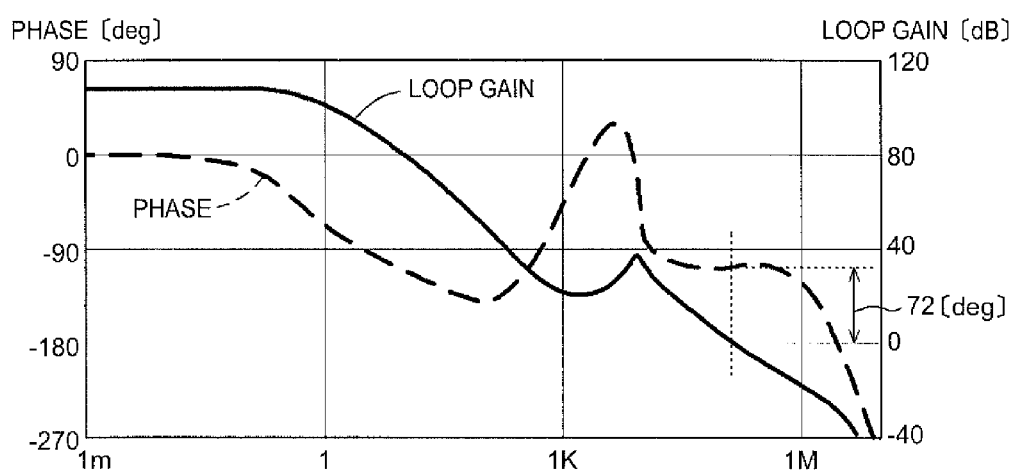
FIG. 46 is a Bode plot of a loop transfer function of the excitation circuit of FIG. 45.

An excitation circuit 11G of FIG. 45 has a circuit configuration that includes a low-pass filter having high capability of removing a high frequency component, and that is capable of ensuring a phase margin of 60 degrees or more. The excitation circuit 11G of FIG. 45 includes, in the preceding stage to the operational amplifier IC 1 as a feedback controller, a band-pass filter 54 that filters the excitation source signal RDout. As described above, "C1" represents a coupling capacitor, which removes the DC component of the excitation source signal RDout to transmit only the AC component thereof to the circuit (operational amplifier IC1) in the subsequent stage. That is, the coupling capacitor "C1" substantially functions as a high-pass filter for the excitation source signal RDout. In the preceding stage to the capacitor C1, a low-pass filter is formed by a resistor R6 and a capacitor Cf. The band-pass filter 54 is thus formed by the high-pass filter having "C1" (and "R1") as a core and the low-pass filter having "R6" and "Cf" as a core. This band-pass filter 54 is placed on the R/D converter 51 side with respect to the feedback point where the excitation signal Vout is fed back to the operational amplifier IC1. FIG. 46 is a Bode plot of a loop transfer function of the excitation circuit 11G of FIG. 45. A phase margin of the excitation circuit 11G of FIG. 45 is about 72 degrees. That is, a sufficient phase margin larger than 60 degrees is ensured.

In the excitation circuit 11G of FIG. 45, the band-pass filter 54 is formed so that the low-pass filter and the high-pass filter are arranged in this order from the preceding stage side (the R/D converter 51 side) toward the operational amplifier IC 1 as a feedback controller. In the case where the high-pass filter and the low-pass filter are arranged in this order from the preceding stage side, a capacitive load (capacitor Cf) is added immediately before (on the input side of) the operational amplifier IC1, and this configuration is therefore not desirable in terms of circuit characteristics. It is therefore preferable to form the band-pass filter 54 so that the low-pass filter and the high-pass filter are arranged in this order from the preceding stage side toward the operational amplifier IC1 as in the excitation circuit 11G of FIG. 45. Since the capacitor C1 that is connected in series with the operational amplifier IC1 does not serve as a capacitive load, the coupling capacitor (capacitor C1) and the input resistor (resistor R1) of the operational amplifier IC1 may be connected in reverse order.

Although the circuits (11E, 11F, 11G) in which the low-pass filter or the band-pass filter 54 is added to the excitation circuit 11A of FIG. 33 are described above, these filters can be similarly applied to the excitation circuits 1 (11, 12) shown in FIGS. 34 to 39. These filters can also be similarly applied to the excitation circuits 1 (11, 12, 13, 14, 15, 16) shown in FIGS. 9, 12, 19, 22, 26, and 29. Since those skilled in the art could readily form specific circuits having the low-pass filter or the band-pass filter applied thereto, illustration and detailed description thereof will be omitted.

As described above by using the various embodiments, according to the present invention, a resolver excitation apparatus can be provided which can be flexibly applied to a wide power supply voltage range, and which can apply a sinusoidal excitation signal having amplitude required for excitation to an excitation winding of a resolver by using a low-loss circuit configuration. Although those skilled in the art could make various modifications based on these embodiments without departing from the spirit and scope of the invention, such modifications fall within the technical scope of the present invention.

INDUSTRIAL APPLICABILITY

The present invention can be used for resolver excitation apparatuses that adjust the amplitude of a sinusoidal excitation source signal to generate an excitation signal having predetermined amplitude in order to excite an exciting winding of a resolver.

DESCRIPTION OF THE REFERENCE NUMERALS

1: Excitation Circuit (Resolver Excitation Apparatus)
2p: Parallel Resonant Element
2s: Series Resonant Element
11 to 16: First to Sixth Circuit Examples (Excitation Circuit)
11A, 11B, 11C, 11D, 11E, 11F, 11G: Excitation Circuit
12A, 12C, 12D: Excitation Circuit
40: Resolver
54: Band-Pass Filter
Cp: Parallel Resonant Capacitor (Parallel Resonant Element)
Cs: Series Resonant Capacitor (Series Resonant Element)
Lr: Excitation Winding
RDout: Excitation Source Signal
Vin: Excitation Source Signal
Vout: Excitation Signal
Zps1: Load Impedance
Zsp2: Load Impedance
Zps3: Load Impedance
Zps4: Load Impedance
Zsp5: Load Impedance
Zsp6: Load Impedance
Zxp: Parallel Resonant Impedance
Zxs: Series Resonant Impedance

The invention claimed is:

1. A resolver excitation apparatus that adjusts amplitude of a sinusoidal excitation source signal to generate an excitation signal having predetermined amplitude in order to excite an exciting winding of a resolver, comprising:
    a parallel resonant circuit having a parallel resonant element that functions as parallel resonant impedance for impedance of the excitation winding;
    a series resonant circuit having a series resonant element that functions as series resonant impedance for the impedance of the excitation winding;
    a feedback controller having an excitation source signal input line to which the excitation source signal is applied, and a feedback loop that feeds the excitation signal back to the excitation source signal input line, and performing feedback control to stabilize the amplitude of the excitation signal; and
    a band-pass filter that is placed in a preceding stage to a feedback point where the excitation signal is fed back, and that filters the excitation source signal.

2. The resolver excitation apparatus according to claim 1, wherein
    the parallel resonant element is a capacitive element connected in parallel with the excitation winding, and the series resonant element is a capacitive element connected in series with the excitation winding.

3. The resolver excitation apparatus according to claim 2, wherein
    the series resonant element is connected to a parallel circuit of the parallel resonant element and the excitation winding.

4. The resolver excitation apparatus according to claim 3, wherein
    a circuit constant of the parallel resonant element is set according to a ratio of the amplitude of the excitation source signal to that of the excitation signal, and
    a circuit constant of the series resonant element is set so that a reactance component of load impedance as synthetic impedance of the excitation winding, the parallel resonant element, and the series resonant element is equal to zero.

5. The resolver excitation apparatus according to claim 2, wherein
    the parallel resonant element is connected to a series circuit of the series resonant element and the excitation winding.

6. The resolver excitation apparatus according to claim 5, wherein
    a circuit constant of the series resonant element is set according to a ratio of the amplitude of the excitation source signal to that of the excitation signal, and
    a circuit constant of the parallel resonant element is set so that a reactance component of load impedance as synthetic impedance of the excitation winding, the parallel resonant element, and the series resonant element is equal to zero.

7. The resolver excitation apparatus according to claim 1, wherein
    the series resonant element is connected to a parallel circuit of the parallel resonant element and the excitation winding.

8. The resolver excitation apparatus according to claim 7, wherein
    a circuit constant of the parallel resonant element is set according to a ratio of the amplitude of the excitation source signal to that of the excitation signal, and a circuit constant of the series resonant element is set so that a reactance component of load impedance as synthetic impedance of the excitation winding, the parallel resonant element, and the series resonant element is equal to zero.

9. The resolver excitation apparatus according to claim 1, wherein the parallel resonant element is connected to a series circuit of the series resonant element and the excitation winding.

10. The resolver excitation apparatus according to claim 9, wherein a circuit constant of the series resonant element is set according to a ratio of the amplitude of the excitation source signal to that of the excitation signal, and a circuit constant of the parallel resonant element is set so that a reactance component of load impedance as synthetic impedance of the excitation winding, the parallel resonant element, and the series resonant element is equal to zero.

11. The resolver excitation apparatus according to claim 1, wherein the band-pass filter is formed so that a low-pass filter and a high-pass filter are arranged in this order from a preceding stage side toward the feedback controller.

12. A resolver excitation apparatus that adjusts amplitude of a sinusoidal excitation source signal to generate an excitation signal having predetermined amplitude in order to excite an exciting winding of a resolver, comprising:

a parallel resonant circuit having a parallel resonant element that functions as parallel resonant impedance for impedance of the excitation winding; and a series resonant circuit having a series resonant element that functions as series resonant impedance for the impedance of the excitation winding; wherein the series resonant element is connected to a parallel circuit of the parallel resonant element and the excitation winding, a circuit constant of the parallel resonant element is set according to a ratio of the amplitude of the excitation source signal to that of the excitation signal, and a circuit constant of the series resonant element is set so that a reactance component of load impedance as synthetic impedance of the excitation winding, the parallel resonant element, and the series resonant element is equal to zero.

13. A resolver excitation apparatus that adjusts amplitude of a sinusoidal excitation source signal to generate an excitation signal having predetermined amplitude in order to excite an exciting winding of a resolver, comprising:

a parallel resonant circuit having a parallel resonant element that functions as parallel resonant impedance for impedance of the excitation winding;

a series resonant circuit having a series resonant element that functions as series resonant impedance for the impedance of the excitation winding; wherein the parallel resonant element is connected to a series circuit of the series resonant element and the excitation winding, a circuit constant of the series resonant element is set according to a ratio of the amplitude of the excitation source signal to that of the excitation signal, and a circuit constant of the parallel resonant element is set so that a reactance component of load impedance as synthetic impedance of the excitation winding, the parallel resonant element, and the series resonant element is equal to zero.

* * * * *